United States Patent
Fudge et al.

(10) Patent No.: US 11,251,832 B2
(45) Date of Patent: Feb. 15, 2022

(54) MULTIPLE CLOCK SAMPLING FOR NYQUIST FOLDED SAMPLING RECEIVERS

(71) Applicant: L-3 Communications Integrated Systems L.P., Greenville, TX (US)

(72) Inventors: Gerald L. Fudge, Rockwall, TX (US); Ryan Lange, Rockwall, TX (US); Calvin A. Coffey, McKinney, TX (US); Frank A. Boyle, Melissa, TX (US); Cameron Johnson, Greenville, TX (US); Christopher A. Fox, Greenville, TX (US)

(73) Assignee: L-3 Communications Integrated Systems L.P., Greenville, TX (US)

( * ) Notice: Subject to any disclaimer, the term of this patent is extended or adjusted under 35 U.S.C. 154(b) by 0 days.

(21) Appl. No.: 17/187,292

(22) Filed: Feb. 26, 2021

(65) Prior Publication Data

US 2021/0273677 A1    Sep. 2, 2021

Related U.S. Application Data

(60) Provisional application No. 62/983,894, filed on Mar. 2, 2020.

(51) Int. Cl.
*H04B 1/7163*    (2011.01)
*H04B 1/00*    (2006.01)
(Continued)

(52) U.S. Cl.
CPC ....... *H04B 1/71637* (2013.01); *H04B 1/0007* (2013.01); *H04L 7/0087* (2013.01); *H04B 1/7174* (2013.01)

(58) Field of Classification Search
CPC .............. H04B 1/71637; H04B 1/0007; H04B 1/7174; H04L 7/0087
See application file for complete search history.

(56) References Cited

U.S. PATENT DOCUMENTS 3,766,480 A    10/1973    Belloc et al.
5,014,018 A    5/1991    Rodwell et al.
(Continued)

FOREIGN PATENT DOCUMENTS

EP    1330036 A1    7/2003

OTHER PUBLICATIONS

Martin, James C. "Analysis of the Nyquist Folding Receiver (NYFR)". University of Oklahoma. Public availability on May 1, 2018. Accessed on Sep. 29, 2021. https://shareok.org/handle/11244/299690 (Year: 2018).*

(Continued)

*Primary Examiner* — David S Huang
(74) *Attorney, Agent, or Firm* — Egan, Enders & Huston LLP.

(57) ABSTRACT

Nyquist folding receivers (NYFRs) are disclosed that use three or more non-modulated sampling clock signals with different frequencies to produce multiple projections in a sampled output. Using these three or more different sampling clock signals, multiple Nyquist zones are aliased together while still allowing signals from different Nyquist zones to be separated and identified in later processing based upon the sampling provided by the different sampling clock signals. NYFR sampling receivers are also disclosed that simultaneously produce multiple separate and different parallel channels from an input signal, with each different channel having a different sampling clock sampling rate from the other channels so as to generate a respective folding pattern that is different from the folding pattern generated by the respective RF sampling rate of each of the other simultaneous and parallel channels. A particular signal may be separated and identified by matching it to the respective different folding patterns in each of the simultaneous multiple different parallel channels.

25 Claims, 16 Drawing Sheets

(51) Int. Cl.
*H04L 7/00* (2006.01)
*H04B 1/717* (2011.01)

(56) References Cited

U.S. PATENT DOCUMENTS

| | | |
|---|---|---|
| 5,454,007 A | 9/1995 | Dutta |
| 6,266,518 B1 | 7/2001 | Sorrells et al. |
| 6,404,830 B2 | 6/2002 | Wiese et al. |
| 6,507,624 B1 | 1/2003 | Jachim et al. |
| 6,574,459 B1 | 6/2003 | Kaminski et al. |
| 6,639,537 B1 | 10/2003 | Raz |
| 6,678,512 B1 | 1/2004 | Kaminski et al. |
| 6,700,388 B1 | 3/2004 | Mayor et al. |
| 6,900,710 B2 | 5/2005 | Agoston et al. |
| 6,975,255 B1 | 12/2005 | Zhang |
| 7,107,033 B2 | 9/2006 | du Toit |
| 7,436,910 B2 | 10/2008 | Fudge et al. |
| 7,436,911 B2 | 10/2008 | Fudge et al. |
| 7,436,912 B2 | 10/2008 | Fudge et al. |
| 7,489,745 B2 | 2/2009 | Fudge |
| 8,149,894 B2 | 4/2012 | Fudge |
| 8,184,673 B2 | 5/2012 | Fudge |
| 8,249,129 B2 | 8/2012 | Fudge |
| 8,401,050 B1 | 3/2013 | Fudge et al. |
| 8,660,218 B2 | 2/2014 | Maleh et al. |
| 2002/0092023 A1 | 7/2002 | Kaizu et al. |
| 2002/0161300 A1 | 10/2002 | Hoff et al. |
| 2003/0016762 A1 | 1/2003 | Martin et al. |
| 2003/0054783 A1 | 3/2003 | Mason et al. |
| 2005/0069046 A1 | 3/2005 | Tsui et al. |
| 2005/0117069 A1 | 6/2005 | McNeely |
| 2006/0133470 A1 | 6/2006 | Raz et al. |
| 2007/0081578 A1 | 4/2007 | Fudge et al. |
| 2010/0189208 A1 | 7/2010 | Fudge et al. |
| 2010/0202566 A1 | 8/2010 | Fudge et al. |

OTHER PUBLICATIONS

Arthur, "Modern SAW-based pulse compression systems for radar applications, Part I: SAW matched filters," Electronics & Communication Engineering Journal, Dec. 1995, pp. 236-246.
Arthur, "Modern SAW-based pulse compression systems for radar applications, Part II: Practical systems," Electronics & Communication Engineering Journal, Apr. 1996, pp. 57-78.
Brandl et al., "High Speed Signal Processing with Tapped Dispersive SAW based Delay Lines," University of Technology, Applied Electronics Laboratory, Vienna Austria, IEEE 2000, pp. 171-176.
Burke, "Ultra-Linear Chirp Generation Via VCO Tuning Predistortion," AIL Systems, Inc., Deer Park, New York, IEEE 1994 MTT-S Digest, pp. 957-960.
Gerard et al., "The Design and Applications of Highly Dispersive Acoustic Surface-Wave Filters," Invited Paper, IEEE Transactions on Microwave Theory and Techniques, vol. MTT-21, No. 4, Apr. 1973, pp. 176-186.
Ong et al., "Digital LPI Radar Detector," Naval Postgraduate School Thesis, Monterey, California, Mar. 2001, pp. 1-81.
Grant et al., "Recent Advances in Analog Signal Processing," IEEE 1990, IEEE Transactions on Aerospace and Electronic Systems, vol. 26, No. 5, Sep. 1990, pp. 818-849.
Li et al., "On the Use of a Compressive Receiver for Signal Detection," IEEE 1991, IEEE Transactions on Communications, vol. 39, No. 4, Apr. 1991, pp. 557-566.
Levy et al., "VCO Based Chirp Generation for Broad Bandwidth Compressive Receiver Applications," AIL Systems, Inc., Deer Park, New York, IEEE 1993 MTT-S Digest, pp. 1113-1115.
Lucyszyn, "Review of radio frequency microelectromechanical systems technology," Imperial College, London, IEE Proc.-Sci. Meas.Technol.vol. 151, No. 2, Mar. 2004, pp. 93-103.
Lyons et al., "High Temperature Superconductive Wideband Compressive Receivers," Analog Device Technology Group, Lincoln Laboratory, Invited Paper, IEEE Transactions on Microwave Theory and Techniques, vol. 44, No. 7, Jul. 1996, pp. 1258-1278.
Unser, "Sampling—50 Years After Shannon," Swiss Federal Institute of Technology, Lausanne, Switzerland, IEEE 2000 Proceedings of the IEEE, vol. 88, No. 4, Apr. 2000, pp. 569-587.
Sengupta et al., "Novel Ferroelectric Materials for Phased Array Antennas," U.S. Army Research Laboratory, Aberdeen Proving Groud, 1997 IEEE, IEEE Transactions on Ultrasonics, Ferroelectrics, and Frequency Control, vol. 44, No. 4, Jul. 1997, pp. 792-797.
Serhan et al., "Automatic Frequency Control Techniques For Microwave Active Filters," Limoges University, Limoges, France, 1997 IEEE MTT-S Digest, pp. 697-700.
Whittaker et al., "Digital chirp filter processing for improved performance of sweeping spectrum analysers," University of Surrey, Surrey, UK, Electronics Letters, Aug. 3, 2000, vol. 36, No. 16, pp. 1430-1432.
Agoston et al., "100 GHz Through-Line Sampler System with Sampling Rates in Excess of 10 G samples/second," Picosecond Pulse Labs, Boulder, Colorado, PSPL—100 Sampler Paper—Submitted to MTT 2003, http://www.picosecond.com->products->sampler modules, 3 pgs.
Akbari-Dilmaghani et al., "A High Q RF CMOS Differential Active Inductor," Imperial College, London, 1998 IEEE International Conference on Electronics, Circuits and Systems, vol. 3, Sep. 7-10, 1998, pp. 157-160.
Akos et al., "Direct Bandpass Sampling of Multiple Distinct RF Signals," 1999 IEEE Transactions on Communications, Vo. 47, No. 7, Jul. 1999, pp. 983-988.
Behbahani et al., "A Broad-Band Tunable CMOS Channel-Select Filter for a Low-IF Wireless Receiver," 2000 IEEE Journal of Solid-State Circuits, vol. 35, No. 4, Apr. 2000, pp. 476-489.
Brown et al., "Digital L-Band Receiver Architecture with Direct RF Sampling," NAVSYS Corp., Colorado Springs, Colorado, Position Location and Navigation Symposium, 1994, IEEE, Apr. 11-15, 1994, pp. 209-216.
Copeland et al., "5-GHz SiGe HBT Monolithic Radio Transceiver with Tunable Filtering," 2000 IEEE Transactions on Microwave Theory and Techniques, vol. 48, No. 2, Feb. 2000, pp. 170-181.
Deleniv et al., "Tunable Ferroelectric Filter-Phase Shifter," University of Technology, Gothenburg, Sweden, 2003 IEEE MTT-S Digest, pp. 1267-1270.
Juodawlkis et al., "Optical Down-Sampling of Wide-Band Microwave Signals," Invited Paper, Journal of Lightwave Technology, vol. 21, No. 12, Dec. 2003, pp. 3116-3124.
Karvonen et al., "A CMOS Quadrature Charge-Domain Sampling Circuit with 66-dB SFDR Up to 100 MHz," 2005 IEEE Transactions on Circuits and Systems-I: Regular Papers, vol. 52, No. 2, Feb. 2005, pp. 292-304.
Koc et al., "Direct RF Sampling Continuous-Time Bandpass /spl Delta/-/spl Sigma/A/D Converter Design for 3G Wireless Applications," ISCAS 2004, May 23-26, 2004, vol. 1, pp. 409-412.
Latiri et al., "A reconfigurable RF sampling receiver for multistandard applications," Comptes Rendus Physique 7 (2006), pp. 785-793.
Lindfors et al., "A 3-V 230-MHz CMOS Decimation Subsampler," 2003 IEEE Transactions on Circuits and Systems-II: Analog and Digital Signal Processing, vol. 50. No. 3, Mar. 2003, pp. 105-117.
Loper, "A Tri-Phase Direct Conversion Receiver," Rockwell International, MILCOM 1990, Sep. 30-Oct. 3, 1990, pp. 1228-1232.
Luy et al., "Configurable RF Receiver Architecture," Daimler-Chrysler Research and Technology, Ulm, Germany, 2004 IEEE Microwave Magazine, Mar. 2004, pp. 75-82.
Minnis et al., "A Highly Digitized Multimode Receiver Architecture for 3G Mobiles," 2003 IEEE Transactions on Vehicular Technology , vol. 52, No. 3, May 2003, pp. 637-653.
Mirabbasi et al., "Classical and Modern Receiver Architectures," University of Toronto, 2000 IEEE Communications Magazine, Nov. 2000, pp. 132-139.
Mostafa et al., "WCDMA Receiver Architecture with Unique Frequency Plan," Micro Lnear Corp. San Jose, California and Texas Instruments, Inc., Dallas, Texas, ASIC/SOC Conference, 2001 Proceedings, 14th Annual IEEE International, Sep. 12-15, 2001, pp. 57-61.

(56) References Cited

OTHER PUBLICATIONS

Muhammad et al., "Direct RF Sampling Mixer With Recursive Filtering in Charge Domain," Texas Instruments Incorporated, Dallas, Texas, ISCAS, May 23-26, 2004, vol. 1, pp. 577-580.
Namgoong et al., "Direct-Conversion RF Receiver Design," 2001 IEEE Transactions on Communications, vol. 49, No. 3, Mar. 2001, pp. 518-529.
Pelion, "RF-to-Digital Receivers Employing Bandpass Multibit /spl Sigma//spl Delta/ ADC Architectures," Lockheed Martin Government Electronic Systems, Morristown, New Jersey, 20$^{th}$ Annual Gallium Arsenide Integrated Circuit (GaAs IC) Symposium, Nov. 1-4, 1998, pp. 11-14.
"Real-Time Sampling Downconverter Front Ends for Digital Radar and Wide-Bank Signaling," Picoscond Pulse Labs, 2500 55$^{th}$ Street, Boulder, CO 80301, (Nov. 2004).
Richter et al., "An Integrated Wideband-IF-Receiver Architecture for Mobile Terminals," Dresden University of Technology, Dresden, Germany, 2003 IEEE Radio Frequency Integrated Circuits Symposium, Jun. 8-10, 2003, pp. 583-586.
Shoji et al., "70-GHz-Band MMIC Transceiver With Integrated Antenna Diversity System: Application of Receive-Module-Arrayed Self-Heterodyne Technique," 2004 IEEE Transactions on Microwave Theory and Techniques, vol. 52, No. 11, Nov. 2004, pp. 2541-2549.
Springer et al., "RF System Concepts for Highly Integrated RFICs for W-CDMA Mobile Radio Terminals," 2002 IEEE Transactions on Microwave Theory and Techniques, vol. 50, No. 1, Jan. 2002, pp. 254-267.
Tatu et al., "Ka-Band Direct Digital Receiver," 2002 IEEE Transactions on Microwave Theory and Techniques, vol. 50, No. 11, Nov. 2002, pp. 2436-2442.
Tayebati et al., "Microelectromechanical tuneable filters with 0.47 nm linewidth and 70nm tuning range," Electonics Letters, Jan. 8, 1998, vol. 34, No. 1, pp. 76-78.
Thor et al., "A Direct RF Sampling Multifrequency GPS Receiver," Stanford University, Position Location and Navigation Symposium, 2002 IEEE, Apr. 15-18, 2002, pp. 44-51.
Tsui et al., "Digital Microwave Receiver Technology," Invited Paper, 2002 IEEE Transactions on Microwave Theory and Techniques, vol. 50, No. 3, Mar. 2002, pp. 699-705.
Valkama et al., "Advanced Receiver Architectures and I/Q Signal Processing," Tampere University of Technology, Tampere, Finland, First International Symposium on Control, Communications and Signal Processing, IEEE Jun. 2004, pp. 71-74.
Vaughan et al., "The Theory of Bandpass Sampling," 1991 IEEE Transactions on Signal Processing, vol. 39, No. 9, Sep. 1991, pp. 1973-1984.
Wooten et al., "Rapidly Tunable Narrowband Wavelength Filter Using LiNbO3 Unbalanced Mach-Zehnder Interferometers," Journal of Lightwave Technology, vol. 14, No. 11, Nov. 1996, pp. 2530-2536.
Pepper et al., "NLTLs Push Sampler Products Past 100 GHz," Microwaves & RF, Oct. 2005, 6 pgs.
Model 7620 DCSM VME Card Datasheet, Revision C, Picosecond Pulse Labs, Boulder, Colorado, Sep. 2005, 10 pgs.
Wepman, "Analog-to-Digital Converters and Their Applications in Radio Receivers," 1995 IEEE Communications Magazine, May 1995, pp. 39-45.
U.S. Appl. No. 60/373,163, filed Apr. 17, 2002, "Tunable modules for frequency agile receivers."
Brueller et al., "On Non-uniform Sampling of Signals," Israel Institute of Technology, Haifa, Israel, ISIE, Jul. 7-10, 1998, pp. 249-252.
Candes et al., "Robust Uncertainty Principles: Exact Signal Reconstruction From Highly Incomplete Frequency Information," 2006 IEEE Transactions on Information Theory, Vo. 52, No. 2, Feb. 2006, pp. 489-509.
Donoho, "Compressed Sensing," 2006 IEEE Transactions on Information Theory, vol. 52, No. 4., Apr. 2006, pp. 1289-1306.

Dragotti et al., "Exact Sampling Results for Signals with Finite Rate of Innovation Using Strang-Fix Conditions and Local Kernels," ICASSP 2005, Mar. 18-23, 2005, pp. 233-236.
Dragotti et al., "Wavelet Footprints: Theory, Algorithms, and Applications," 2003 IEEE Transactions on Signal Processing, vol. 51, No. 5, May 2003, pp. 1306-1323.
Duarte et al., "Distributed Compressed Sensing of Jointly Sparse Signals," Rice University, Houston, Texas, Asilomar Conference on Signals, Systems and Computers 2005, Oct. 28-Nov. 1, 2005, pp. 1537-1541.
Gansman et al., "Single Frequency Estimation with Non-uniform Sampling," Asilomar Conference on Signals, Systems and Computers 1996, Nov. 3-6, 1996, vol. 1, pp. 399-403.
Herley et al., "Minimum Rate Sampling and Reconstruction of Signals with Arbitrary Frequency Support," 1999 IEEE Transactions on Information Theory, vol. 45, No. 5, Jul. 1999, pp. 1555-1564.
Kumar et al., "On Distributed Sampling of Bandlimited and Non-Bandlimited Sensor Fields," University of California, Berkeley, California, ICASSP 2004, May 17-21, 2004 vol. III., pp. 925-928.
Lefkaditis et al., Ambiguities in the harmonic retrieval problem using non-uniform sampling, IEE Proceedings—Radar, Sonar and Navigation, Dec. 2001, pp. 325-329.
Maravic et al., "Channel Estimation and Synchronization with Sub-Nyquist Sampling and Application to Ultra-Wideband Systems," ISCAS 2004, May 23-26, 2004, pp. V-381-V-384.
Maravic et al., "Sampling and Reconstruction of Signals With Finite Rate of Innovation in the Presence of Noise," 2005 IEEE Transactions on Signal Processing, vol. 53, No. 8, Aug. 2005, pp. 2788-2805.
Pace et al., "Use of the Symmetrical No. System in Resolving Single-Frequency Undersampling Aliases," 1997 IEEE Transactions on Signal Processing, vol. 45, No. 5, May 1997, pp. 1153-1160.
Sanderson et al., "Reduction of Aliasing Ambiguities Through Phase Relations," 1992 IEEE Transactions on Aerospace and Electronic Systems, vol. 28, No. 4, Oct. 1992, pp. 950-956.
Sayiner et al., "A Non-Uniform Sampling Technique For A/D Conversion," ISCAS 193, May 3-6, 1993, pp. 1220-1223.
Styer et al., "Two Channel RSNS Dynamic Range," 2002 IEEE Transactions on Circuits and Systems-I: Fundamental Theory and Applications, vol. 49, No. 3., Mar. 2002, pp. 395-397.
Vetterli et al., "Sampling Signals With Finite Rate of Innovation," 2002 IEEE Transactions on Signal Processing, vol. 50, No. 6, Jun. 2002, pp. 1417-1428.
Walter, "Non-Uniform Sampling in Wavelet Subspaces," University of Wisconsin, Milwaukee, Wisconsin, ICASSP 1999, pp. 2057-2059.
Xia, "An Efficient Frequency-Determination Algorithm from Multiple Undersampled Waveforms," 2000 IEEE Transactions on Signal Processing Letters, vol. 7, No. 2, Feb. 2000, pp. 34-37.
Xiong et al., "A Non-uniform Sampling Tangent Type FM Demodulation," 2004 IEEE Transactions on Consumer Electronics, vol. 50, No. 3., Aug. 2004, pp. 844-848.
Zhu et al., "Adaptive Non-Uniform Sampling Delta Modulation For Audio/Image Processing," 1996 IEEE Transactions on Consumer Electronics, vol. 42, No. 4, Nov. 1996, pp. 1062-1072.
Weller et al., "Jitter Compensation In Sampling Via Polynomial Least Squares Estimation", 2009, 4 pgs.
Weller et al., "Nonlinear Digital Post-Processing To Mitigate Jitter in Sampling", Sep. 2008, 24 pgs.
Fudge et al., "System And Method For Clock Jitter Compensation In Direct RF Receiver Architectures", Provisional Application LCOM:086PZ1, U.S. Appl. No. 61/203,114, filed Dec. 18, 2008; 10 pgs.
Fudge et al., "System And Method For Improved Spur Reduction In Direct RF Receiver Architectures", Provisional Application LCOM:087PZ1, U.S. Appl. No. 61/203,115, filed Dec. 18, 2008; 17 pgs.
Tarczynski et al., "Optimal Periodic Sampling Sequences For Nearly-Alias Free Digital Signal Processing", IEEE, 2005, 4 pgs.

(56) References Cited

OTHER PUBLICATIONS

Artyukh et al., "Wideband RF Signal Digitising For High Pruity Spectral Analysis", International Workshop On Spectral Methods And Multirate Signal Processing, Jun. 2005, 6 pgs.
Pace et al., "Use Of The Symmetrical No. System In Resolving Single-Frequency Undersampling Aliases", IEEE Transactions On Signal Processing, vol. 45, No. 5, May 1997, 8 pgs.

\* cited by examiner

For the case of a narrow-band input signal the normalized output is $x(t) = \cos(\omega_C t + \psi(t))$ $y(t) \approx \cos(|\omega_C - k_H \omega_{S1}|t + \beta\psi(t) - M\theta(t))$ Bandpass-Sampled Carrier Translation
Signal Information (Spectrally Oriented)
Induced Modulation (Spectrally Oriented)

$M = \beta k_H$    $\beta = \text{sgn}(\omega_C - k_H \omega_{S1})$    $k_H = \text{round}(\omega_C / \omega_{S1})$ M is directly related to signal Nyquist zone

FIG. 3
(PRIOR ART)

MULTIPLE CLOCK SAMPLING FOR NYQUIST FOLDED SAMPLING RECEIVERS

This application claims the benefit of U.S. Provisional Patent Application Ser. No. 62/983,894, filed on Mar. 2, 2020 and entitled "Multiple Clock Sampling For Nyquist Folded Sampling Receivers", which is incorporated herein by reference in its entirety for all purposes.

FIELD

This invention relates to receiver architectures, and more particularly to receiver architectures for sampling of RF signals.

BACKGROUND

A wide variety of signals and related protocols exist for the use of radio frequency (RF) signals in communication systems and other devices, such as radar systems. Prior receiver architectures for such RF communication systems are described in U.S. Pat. No. 7,436,910, entitled "DIRECT BANDPASS SAMPLING RECEIVERS WITH ANALOG INTERPOLATION FILTERS AND RELATED METHODS;" U.S. Pat. No. 7,436,912, entitled "NYQUIST FOLDED BANDPASS SAMPLING RECEIVERS AND RELATED METHODS;" and U.S. Pat. No. 8,401,050 entitled "MULTIPLE PROJECTION SAMPLING FOR RF SAMPLING RECEIVERS," each of which is hereby incorporated by reference in its entirety.

FIG. 1 (Prior Art) shows an embodiment for a reconfigurable direct RF bandpass sampling receiver (RDRFBSR), such as those described in U.S. Pat. No. 7,436,910. As depicted, the radio frequency (RF) input signal 116 is first passed through a low noise amplifier (LNA) 102. The output 130 of the LNA 102 is provided to a tunable/switchable bandpass filter 104, which can be configured to have a tunable center frequency and a programmable bandwidth dependent upon one or more filter control signals 105. The filtered output signal 132 is received by the non-quantizing sampler 204, which samples the signals at times determined by the RF sample clock 212 resulting in a discrete time continuous voltage sampled signal. The sampled signal is then filtered by the interpolation filter, resulting in a continuous time continuous voltage signal, which is then sampled and quantized by the analog to digital converter (ADC) 210 at sample rate determined by the ADC Sample Clock 214 after optional amplification by the IF amp 208. The digital output signals from the ADC 210 are then further processed by digital signal processing (DSP) circuitry 114 to produce baseband in-phase path (I) and quadrature path (Q) signals.

FIG. 2 (Prior Art) shows an embodiment of a Nyquist folding receiver (NYFR) 300, such as those described in U.S. Pat. No. 7,436,912. The NYFR is similar to the RDRFBSR. Starting with the RDRFBSR, the anti-alias filter is replaced with a wideband pre-select filter, and the constant RF sample clock is replaced with a frequency modulated sample clock that generates sample times at the zero-crossing rising voltage of a frequency modulated clock. In FIG. 2, an ultra-wideband (UWB) front end filter 302 is present in front of a non-quantizing RF sampler 204 to allow reception of multiple Nyquist zones. The non-quantizing RF sampler 204 uses modulated RF sample clock circuitry 304, and is followed by an analog interpolation filter 206 and an ADC 210. The ADC 210 receives an ADC sampling clock signal 214 from ADC clock circuitry. The wideband filter 302 has a bandwidth that is wide enough to pass multiple Nyquist zones where the Nyquist zones are determined by the RF sampling clock frequency for the non-quantizing RF sampler 204. The modulated sample clock circuitry 304 provides an RF sampling clock signal to the non-quantizing RF sampler 204 that is not constant and is adjusted or modulated during sampling.

FIG. 3 (Prior Art) shows the input/output characteristics of the NYFR. In particular, an input signal has an induced modulation $M\Theta(t)$, where $\Theta(t)$ is the phase modulation of the RF sample clock and M depends on the Nyquist zone in which the signal originated. Thus, a broadband RF input can be sampled at far less than Nyquist, allowing individual signals from different Nyquist zones to alias (or fold) into the analog interpolation filter. The original RF frequency from which each signal aliased can then be determined without ambiguity by measuring M.

FIG. 4 (Prior Art) illustrates a multiple clock RF receiver sampling system architecture, such as those described in U.S. Pat. No. 8,401,050. As shown in FIG. 4 (Prior Art), sampling circuitry 402 of system 400 receives a RF input 432 which may be filtered to a bandwidth selected to fit the complexity or density of the given signal environment. Sampling circuitry 402 also receives multiple sampling clock input signals, each at a desired frequency, simultaneously from multiple sampling clocks 404a and 404b. One of the sampling clocks is modulated. The sampling clock signals from each of clocks 404a and 404b determines the sampling frequencies for the sampling circuitry 402. In this embodiment, the simultaneous signals from clocks 404a and 404b are processed together in the sampling circuitry 402 to generate at least two images in sampling output signal 433. Although two sampling clocks 404a and 404b are illustrated for this embodiment, it is also possible that three or more sampling clocks 404 may be employed in a similar manner. The separate sampling clocks 404 may not necessarily be the same, and in some embodiments at least one sampling clock 404 may be non-modulated to simplify processing, although each sampling clock may be modulated in other embodiments. The sampling circuitry 402 may be provided as part of a RF sampling receiver system that is configured in any manner suitable for simultaneously sampling RF data utilizing separate multiple clock signals to provide multiple corresponding images from a RF input signal.

As described in U.S. Pat. No. 8,401,050, a modulated RF sampling clock signal may be employed to produce non-uniform sampling such that the instantaneous frequencies obtained for different received signals will appear with a particular signature (e.g., each with a different frequency slope). Thus, even though Nyquist zones may fold on top of each other, different signals from different Nyquist zones can be separated and identified based on the fact that the added modulation is different for each Nyquist zone. As such, the slope of each sampled signal can be measured, and the original Nyquist zone from which each signal originated can determined even though these two signals will have been folded together during sampling. It is also noted that signals from odd-numbered Nyquist zones (1st, 3rd, etc.) will have opposite induced modulation slope than signals from even-numbered Nyquist zones. This use of clock modulations to provide non-uniform sampling and to induce frequency modulations that are Nyquist zone dependent allows multiple Nyquist zones to be aliased together while still allowing for signals from different Nyquist zones to be separated and identified. This non-uniform sampling allows for the frequency modulations generated by sampling to be different in different Nyquist zones. As such, a single clock modulation, or multiple clock modulations, mathematically translate into different signal modulations depending upon the Nyquist zone in which the signals are located before being folded together thereby allowing separation of the aliased signals and determination of the Nyquist zone from which they came.

In some embodiments, a single clock signal for each sampler 502a or 502b may be utilized, if desired, in FIG. 6 of U.S. Pat. No. 8,401,050. In such an implementation, the clock generation circuitry of each sampling clock 404a or 404b may provide a single fixed sampling clock output signal for its respective sampler 502a or 502b. Provision for different clock signals allow for selection of an appropriate sampling clock based on meeting the Nyquist criteria of the bandpass filter and based on criteria so as to avoid Nyquist sampling problems due to Nyquist boundaries. Nyquist zones are determined by the sampling rate for the sampling circuitry 106, and Nyquist criteria locate sampling zone boundaries at integer (K=0, 1, 2, 3 . . . ) multiples of $f_s/2$ starting at DC (frequency=0 Hz). In addition, Nyquist zones alternate between non-inverted and inverted spectrums Traditional Nyquist criteria states that for bandpass sampling, the sampling rate must be two-times or greater than the bandwidth of the signal frequency range of interest, and that for baseband sampling, the sampling rate must be two-times or greater than the maximum frequency for the signal frequency range of interest. Further description of Nyquist folded sampling methodology and system components may be found in U.S. Pat. Nos. 7,436,912 and 8,401,050, each of which is incorporated herein by reference in its entirety.

SUMMARY OF THE INVENTION

Embodiments are disclosed for Nyquist folded sampling receivers that use three or more sampling clocks to simultaneously generate three or more different non-modulated sampling clock signals that are used to sample an input RF spectrum and to identify signals within the input RF signal spectrum. Various features can be implemented, and related systems and methods can be utilized, as well.

In one embodiment, a wideband radio frequency (RF) receiver may be implemented using aliased sampling to identify signals with reduced ambiguities and simpler circuitry as compared to previously-existing signal identification architectures. In one embodiment, all of the multiple different sampling clock signals may be non-modulated.

In one embodiment, multiple separate and different channels may be simultaneously implemented or produced with each other, and each different channel may have a different RF sampling rate from the other channels so as to generate a respective folding pattern that is different from the folding pattern generated by the respective RF sampling rate of each of the other simultaneous channels. Signal detections in each of the multiple different channels may be matched and disambiguated to determine a signal of interest (SOI) by finding unfolded matches. In one embodiment, each of the multiple separate and different channels may be implemented in parallel to each other within a single RF receiver. Advantageously, employing multiple separate and different parallel channels with different respective RF sampling rates allows simpler processing to be used to identify signals within an input RF signal than would otherwise be possible if not sampling using multiple separate and different parallel channels. Further, use of multiple separate and different parallel channels with different RF sampling rates allows RF signals to be identified within denser signal environments (i.e., RF environments that include a greater number of different RF signals and/or interference) than would otherwise be possible if not sampling using multiple separate and different parallel channels.

In another embodiment, each different channel of the multiple separate and different channels may be sampled at a different RF sampling rate using a different clock signal provided from a respective different sampling clock, and all of the different sampling clock signals may be non-modulated signals. In other embodiments, all or a portion of the multiple different sampling clock signals used to simultaneously produce the multiple separate and different channels may be modulated, with the balance of these multiple different sampling clock signals being non-modulated.

In one respect, disclosed herein is receive path circuitry for a sampling receiver, including: three or more sampling clocks, each sampling clock being configured to produce a non-modulated sampling clock signal having a frequency different from frequencies for sampling clock signals produced by the other sampling clocks; sampling circuitry having a sampling circuitry input configured to receive input signals within a bandwidth wide enough to cover multiple Nyquist zones associated with the sampling clock signals, the sampling circuitry configured to receive the input signals and to receive each of the sampling clock signals from the sampling clocks, each of the sampling clock signals being configured to provide sampling for the input signals within the multiple Nyquist zones to produce a different image from the other sampling clocks; and a sampling circuitry output configured to produce an output signal that includes the different images generated by the three or more sampling clock signals. In one embodiment, the sampling circuitry may include: a first sampler coupled to receive the input signals from the sampling circuitry input and coupled to receive a first sampling clock signal from a first one of the sampling clocks, the first sampler configured to output a first image produced by sampling each of the input signals with the first sampling clock; a second sampler coupled to receive the input signals from the sampling circuitry input and coupled to receive a second sampling clock signal from a second one of the sampling clocks, the second sampler configured to output a second image produced by sampling each of the input signals with the second sampling clock; a third sampler coupled to receive the input signals from the sampling circuitry input and coupled to receive a third sampling clock signal from a third one of the sampling clocks, the third sampler configured to output a third image produced by sampling each of the input signals with the second sampling clock; and adder circuitry configured to combine outputs from the first, second, and third sampler to produce the sampling circuitry output signal. In one embodiment, the first, second, and third samplers may be configured to sample with different gains so as to produce the respective first, second, and third images with different amplitudes from each other. In one embodiment, the receive path circuitry may further include digital signal processing circuitry coupled to receive the sampling circuitry output signal and configured to compare the different amplitudes of the respective first, second, and third images with each other to determine which of the first, second, and third samplers and their respective sampling clocks produced at least one of the respective first, second, and third images. In one embodiment, the receive path circuity may further include wideband filter circuitry having a center frequency within a frequency range of interest and having a bandwidth less than or equal to the frequency range of interest and wide enough to cover multiple Nyquist zones associated with sampling clocks, the wideband filter circuitry being configured to provide a filtered signal as the input signal to the sampling circuitry input.

In another respect, disclosed herein is a method for bandpass sampling of signals using folded Nyquist zones, including: providing sampling circuitry; generating three or more non-modulated sampling clock signals for sampling within the multiple Nyquist zones, each of the sampling clock signals having a frequency that is different from frequencies for other of the sampling clock signals; utilizing sampling circuitry to sample input signals within the multiple Nyquist zones with each of the sampling clock signals to produce multiple different images corresponding to each of the input signals; and producing an output signal from the sampling circuitry that includes the multiple different images generated by sampling each of the input signals using each of the multiple sampling clock signals. In one embodiment, the method may further include: generating a first sampling clock signal and sampling the input signals using the first sampling clock signal to produce a first image corresponding to each input signal; generating a second sampling clock signal and sampling the input signals using the second sampling clock signal to produce a second image corresponding to each input signal; generating a third sampling clock signal and sampling the input signals using the second sampling clock signal to produce a second image corresponding to each input signal; and combining the first, second, and third images to produce the output signal from the sampling circuitry. In one embodiment, the method may further include using different gains to sample the input signals with the first, second, and third sampling clock signals. In one embodiment, the method may further include comparing amplitudes of the first, second, and third images in the output signal from the sampling circuitry to determine which of the first, second, and third samplers and their respective sampling clock signals produced at least one of the respective first, second, and third images. In one embodiment, the method may further include filtering an RF input to produce a filtered signal including the input signals by utilizing wideband filter circuitry having a center frequency within a frequency range of interest and having a bandwidth less than or equal to the frequency range of interest and wide enough to cover multiple Nyquist zones associated with the sampling clock signals, and in which utilizing the sampling circuitry to sample the input signals within the multiple Nyquist zones may further include utilizing the sampling circuitry to sample the input signals in the produced filtered signal. In one embodiment, utilizing the sampling circuitry to sample the input signals within the multiple Nyquist zones may further include sampling the input signals without quantizing the signal, and the method may further include: filtering the output signal from the sampling circuitry with an analog interpolation filter having a center frequency within a Nyquist zone, and quantizing a signal received from the analog interpolation filter.

In another respect, disclosed herein is receive path circuitry for a sampling receiver, including: three or more sampling clocks, each sampling clock producing a sampling clock signal having a frequency different from frequencies for sampling clock signals produced by the other sampling clocks; sampling circuitry having a sampling circuitry input receiving input signals within a bandwidth wide enough to cover multiple Nyquist zones associated with the sampling clock signals, the sampling circuitry receiving the input signals and to receive each of the sampling clock signals from the sampling clocks, each of the sampling clock signals providing sampling for the input signals within the multiple Nyquist zones to produce a different image from the other sampling clocks; and a sampling circuitry output producing an output signal that includes the different images generated by the three or more sampling clock signals. The output signal my include three or more separate and different parallel channels, each of the parallel channels including one of the different images produced by sampling the input signals using a respective one of the three or more sampling clock signals having a frequency that is different than the frequency of the other three or more sampling clock signals that samples the input signals to produce the different images included in each of the other parallel channels. In one embodiment the receive path circuity may further include digital signal processing circuitry coupled to receive the three or more separate and different parallel channels of the output signal from the sampling circuitry and programmed to identify different signals from different Nyquist zones based upon frequency position of folded images generated by the sampling clock signals. In one embodiment, the digital signal processing circuitry may be programmed to identify a given input signal from a given Nyquist zone by: determining frequency positions of multiple possible candidate signals from different Nyquist zones based upon a first one of the sampling clock signals; and identifying the given input signal from the given Nyquist zone as the candidate signal having a folded frequency that matches the folded frequency that results from sampling of the given input signal caused by the other sampling clock signals.

In another respect, disclosed herein is a method for bandpass sampling of signals using folded Nyquist zones, including: providing sampling circuitry; producing three or more sampling clock signals for sampling within the multiple Nyquist zones, each of the sampling clock signals having a frequency that is different from frequencies for other of the sampling clock signals; utilizing sampling circuitry to sample input signals within the multiple Nyquist zones with each of the sampling clock signals to produce multiple different images corresponding to each of the input signals; and producing an output signal from the sampling circuitry that includes the multiple different images generated by sampling each of the input signals using each of the multiple sampling clock signals. The output signal may include three or more separate and different parallel channels, each of the parallel channels including one of the different images produced by sampling the input signals using a respective one of the three or more sampling clock signals having a frequency that is different than the frequency of the other three or more sampling clock signals that samples the input signals to produce the different images included in each of the other parallel channels. In one embodiment, the method may further include identifying different signals from different Nyquist zones based at least in part upon frequency position of folded images generated by the sampling clock signals. In another embodiment, the method may further include identifying a given input signal from a given Nyquist zone by: determining frequency positions of multiple possible candidate signals from different Nyquist zones based upon a first one of the sampling clock signal; and identifying the given input signal from the given Nyquist zone as the candidate signal having a folded frequency that matches the folded frequency that results from sampling of the given input signal caused by the other sampling clock signals.

DESCRIPTION OF THE DRAWINGS

It is noted that the appended drawings illustrate only exemplary embodiments of the invention and are, therefore, not to be considered limiting of its scope, for the invention may admit to other equally effective embodiments.

FIG. 3 (Prior Art) provides an explanation of mathematical expressions associated with the NYFR signals.

DETAILED DESCRIPTION OF THE INVENTION

In certain embodiments of the disclosed systems and methods, Nyquist folded sampling receivers may be implemented that use three or more sampling clocks to simultaneously generate three or more different non-modulated sampling clock signals that are used to sample an input RF spectrum and to identify signals within the input RF signal spectrum. By using three or more different sampling clocks without modulation, multiple Nyquist zones may be aliased together while still allowing for signals from different Nyquist zones to be separated and identified.

Figure 1:
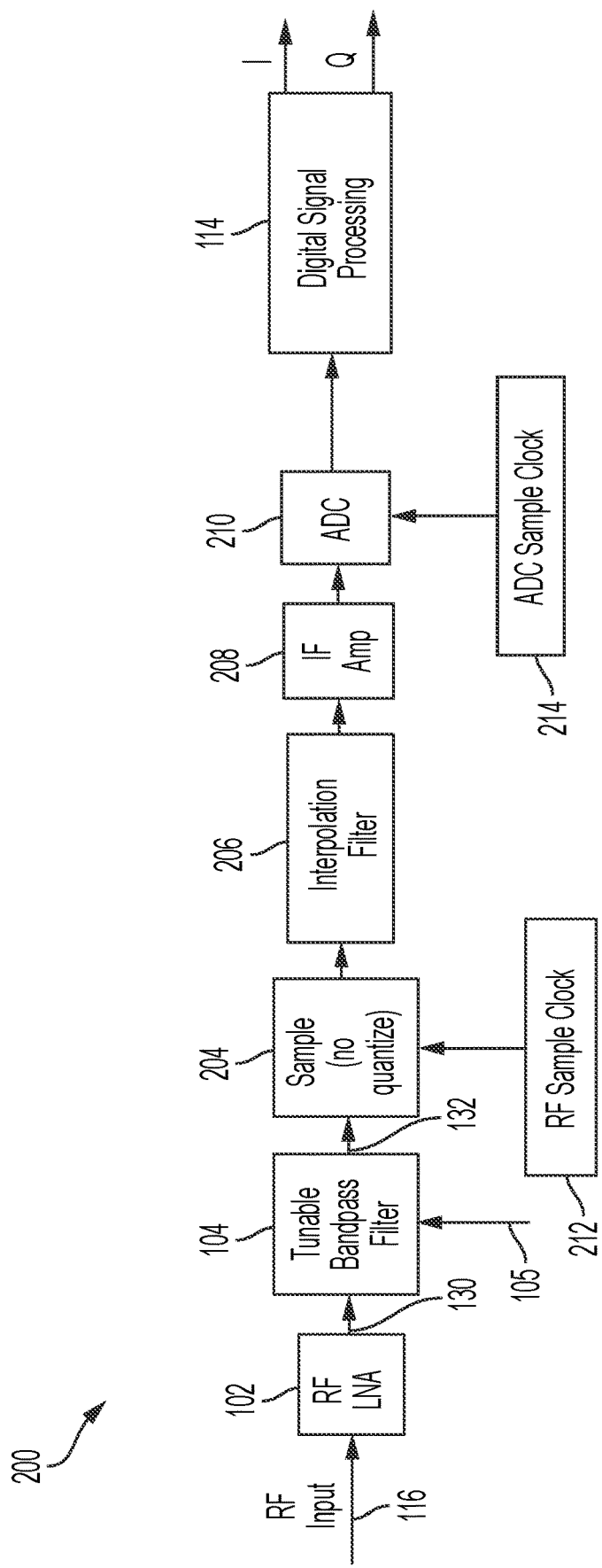
FIG. 1 (Prior Art) is a block diagram for a reconfigurable direct RF bandpass sampling receiver (RDRFBSR).
Figure 2:
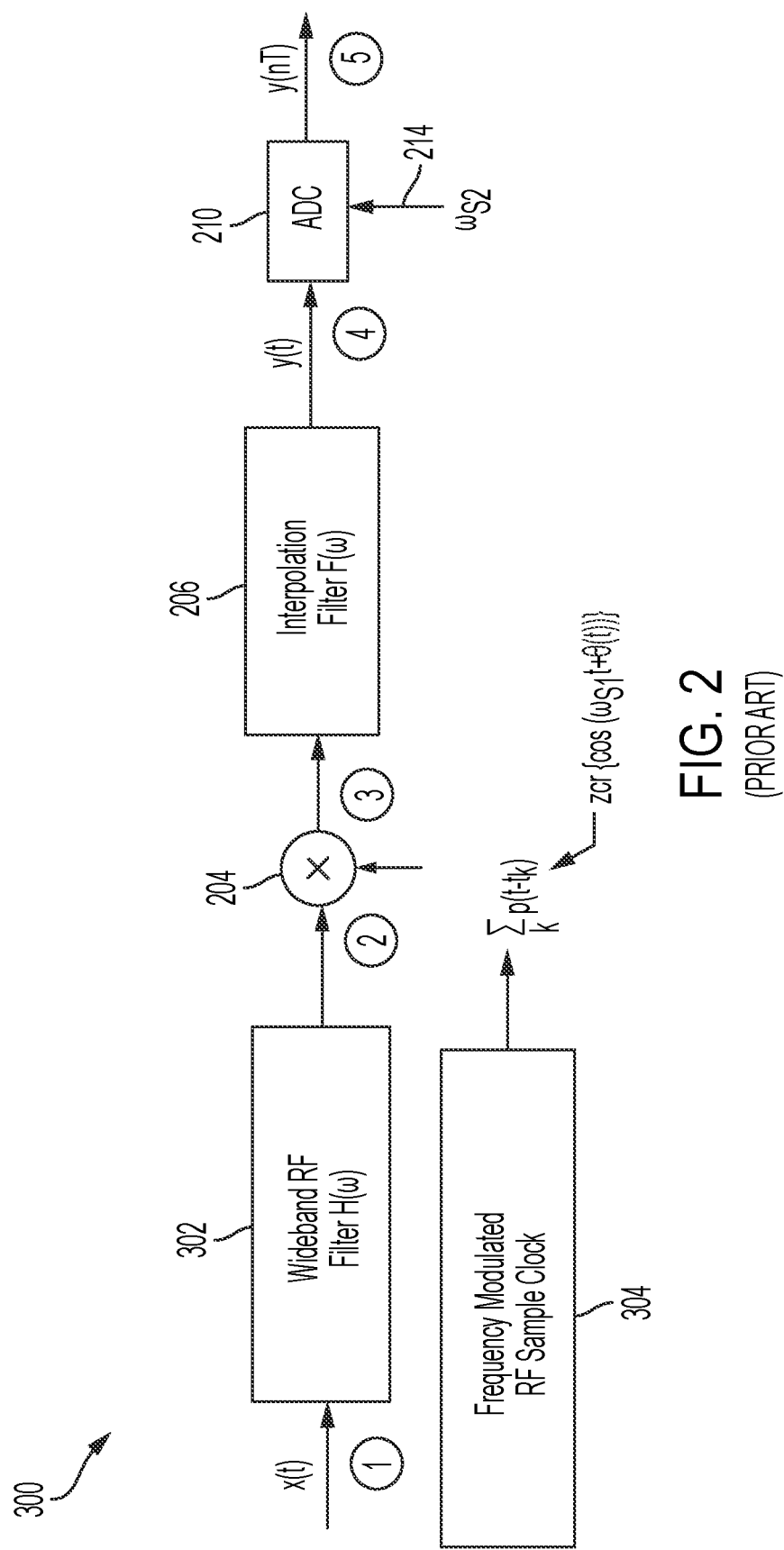
FIG. 2 (Prior Art) is a block diagram for a Nyquist folding receiver (NYFR).
Figure 4:
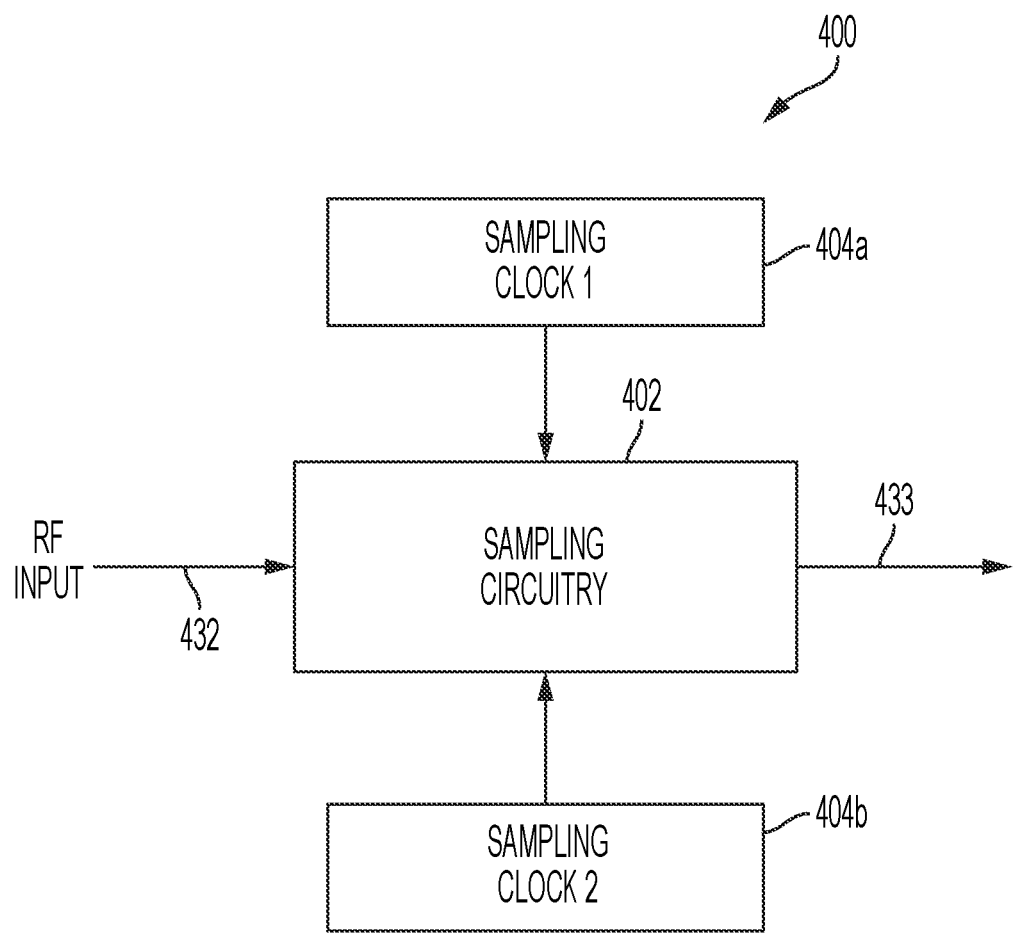
FIG. 4 (Prior Art) is a block diagram of a multiple clock RF receiver sampling system architecture according to one exemplary embodiment of the disclosed systems and methods.
Figure 5:
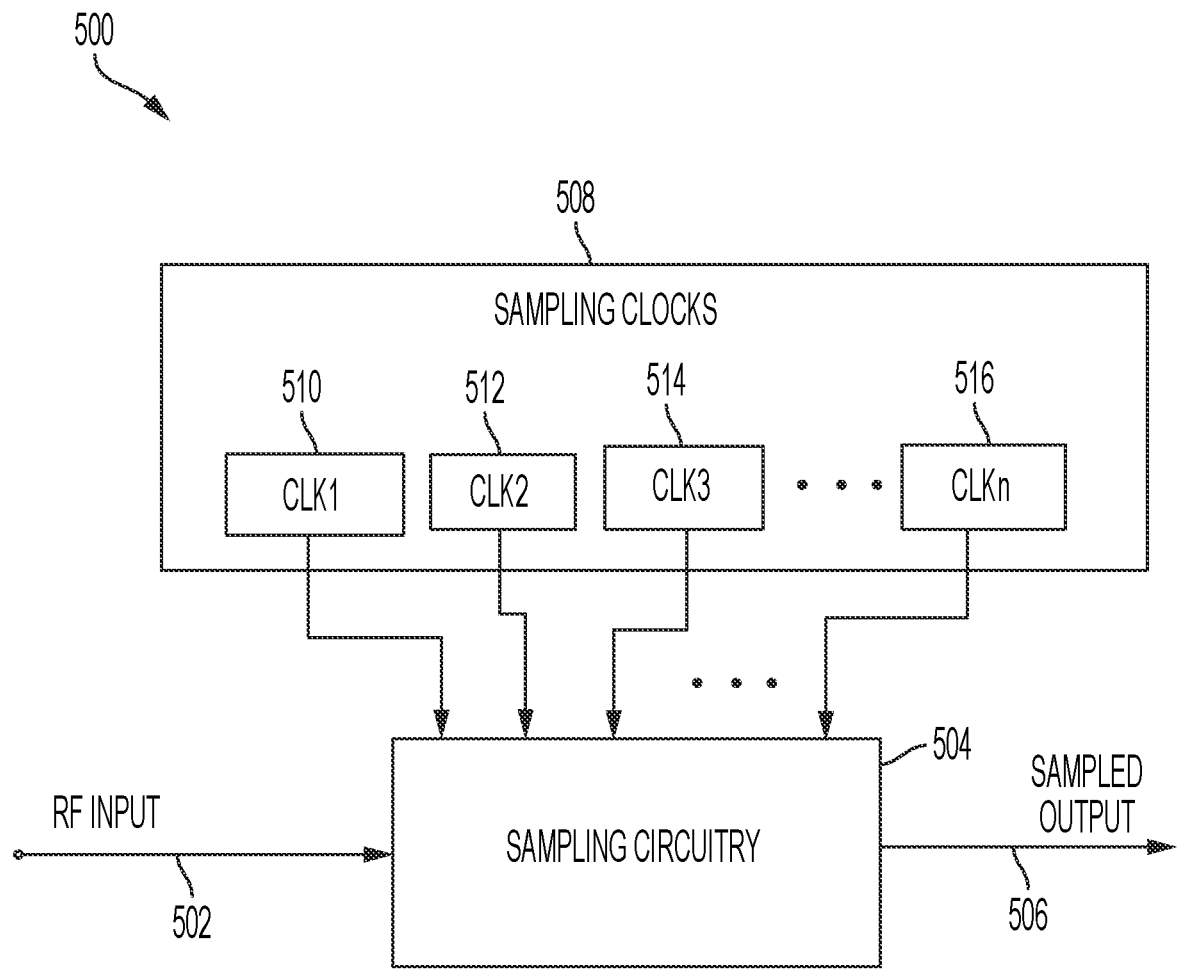
FIG. 5 is a block diagram of a multiple clock RF receiver sampling system according to one exemplary embodiment of the disclosed systems and methods.

FIG. 5 illustrates a multiple clock RF receiver sampling system 500 according to one embodiment of the disclosed systems and methods. As shown in FIG. 5, sampling circuitry 504 of system 500 receives an RF input 502. For one example embodiment, the RF input 502 can be filtered to a bandwidth selected to fit the complexity or density of the given signal environment. Sampling circuitry 504 also receives simultaneously three or more different sampling clock input signals from sampling clocks 508, each at a desired frequency. As shown in FIG. 5, sampling clocks 508 includes three or more separate sampling clocks 510, 512, 514 . . . 516. In this regard, the total number of separate sampling clocks in system 500 may be three in one embodiment, and may be more than three in other embodiments. The sampling clock signals from each of individual clocks 510, 512, 514 . . . 516 within the sampling clocks 508 determine the sampling frequencies for the sampling circuitry 504. In this embodiment, the simultaneous signals from sampling clocks 508 are processed together in the sampling circuitry 504 to generate at least three images in sampled output 506. In one embodiment, all of the sampling clock signals provided by sampling clocks 508 may be non-modulated, and the respective sampling clock rate for each of sampling clocks 510, 512, 514 . . . 516 is constant and does not change over time. Instead, the constant sampling clock rate is different for each of sampling clocks 510, 512, 514 . . . 516, and a given signal of RF input 502 is therefore simultaneously sampled at any given time by each and all of the different constant sampling clock rates that are simultaneously provided by respective sampling clocks 510, 512, 514 . . . 516.

Figure 6A:
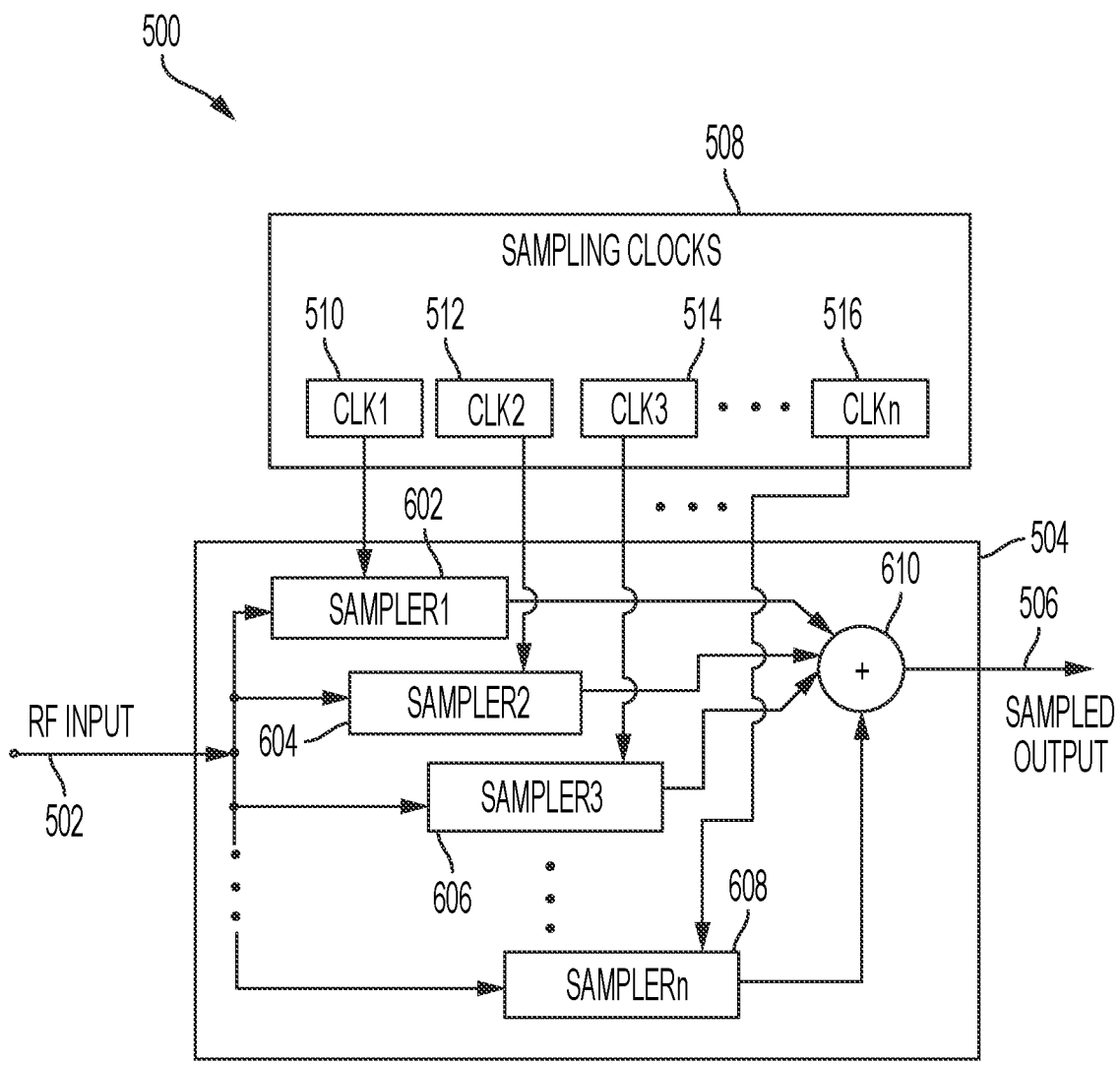
FIG. 6A is a block diagram of a multiple clock RF receiver sampling system according to one exemplary embodiment of the disclosed systems and methods.
Figure 6B:
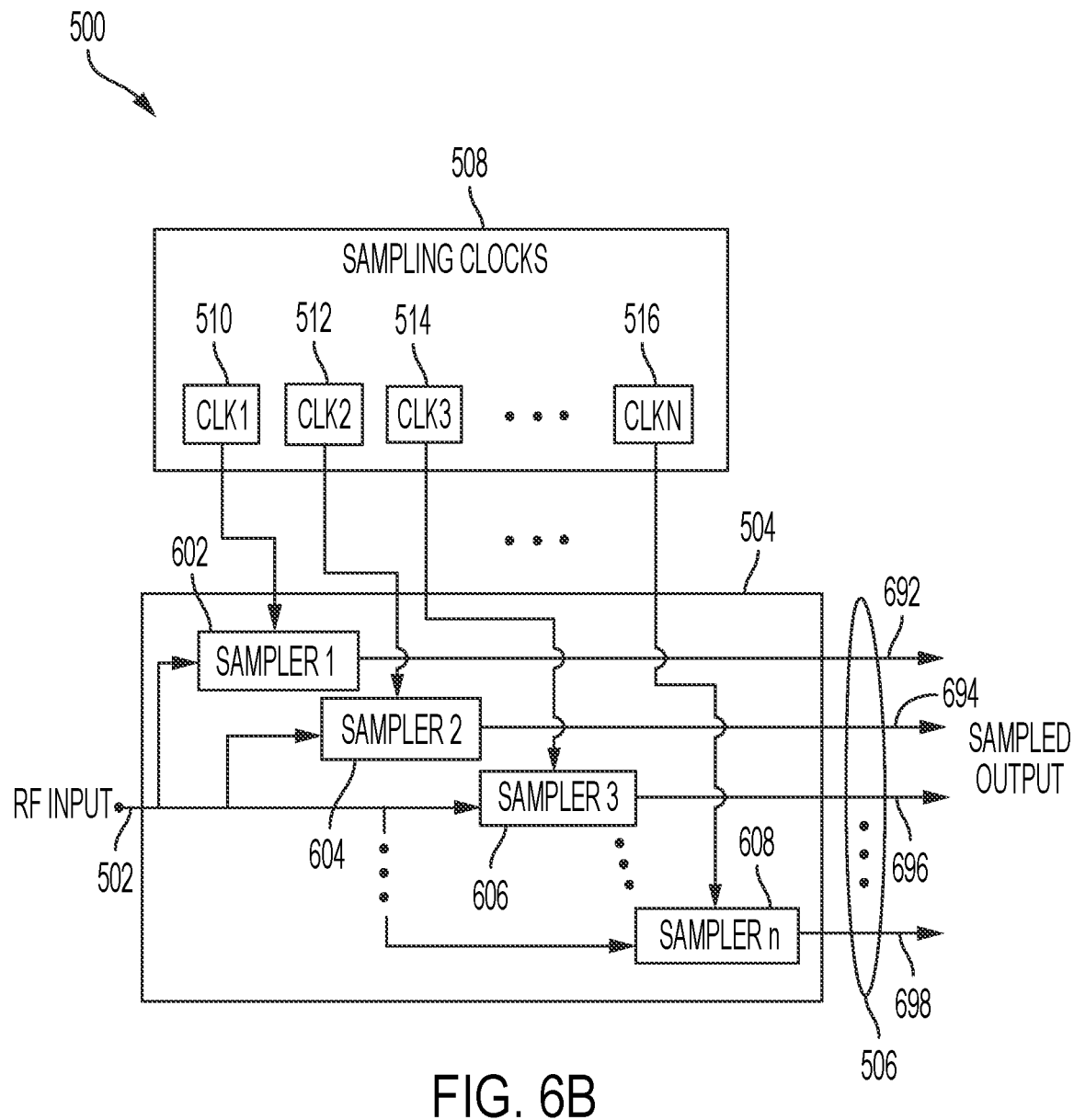
FIG. 6B is a block diagram of a multiple clock RF receiver sampling system according to one exemplary embodiment of the disclosed systems and methods.
Figure 7:
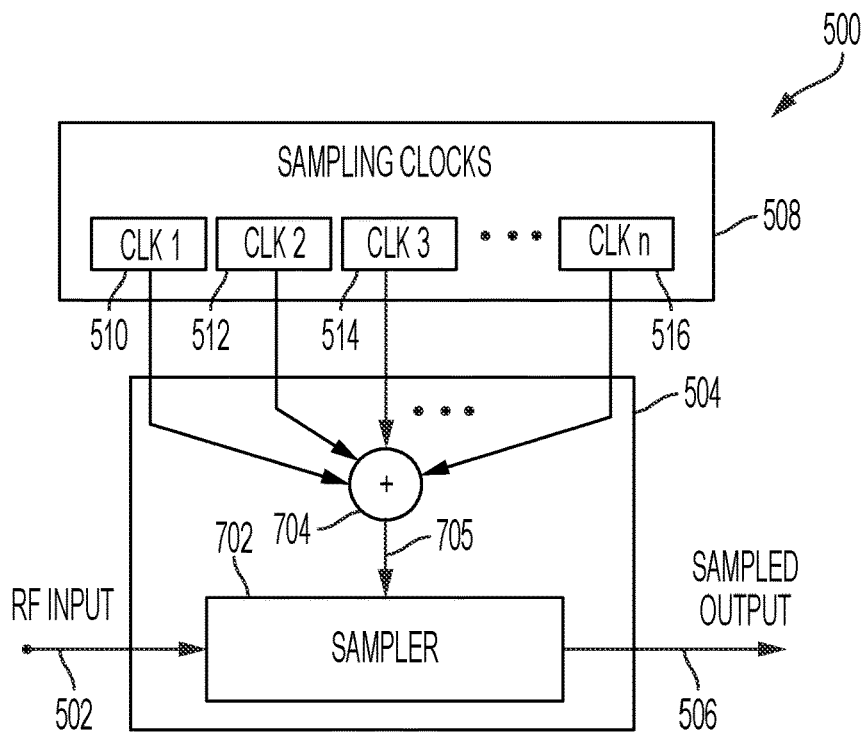
FIG. 7 is a block diagram of a multiple clock RF receiver sampling system according to one exemplary embodiment of the disclosed systems and methods.

It will be understood that center frequencies of each RF sample clock 510, 512, 514 . . . 516 are different to minimize spectral overlap. In the context of compressive sensing (CS), this allows multiple projections using different projection matrices of the same data with a single ADC for some embodiments. The sampling clock signals from the multiple sample clocks 510, 512, 514 . . . 516 can be provided to multiple samplers as shown in FIG. 6A and FIG. 6B. Further, the sampling clock signals from multiple sample clocks 510, 512, 514 . . . 516 can be added together prior to sampling as shown in FIG. 7. As such, a single Nyquist folding receiver signal processing path or channel may be implemented. Other variations can also be implemented.

It will be understood that sampling circuitry 504 may be provided as part of a RF sampling receiver system that is configured in any manner suitable for simultaneously sampling RF data utilizing three or more different clock signals to provide multiple corresponding images from a RF input signal. Example embodiments for receiver architectures are described with respect to FIGS. 10A-10B below. Additional examples of suitable RF sampling architectures having sampling circuitry which may be modified and implemented in combination with the disclosed systems and methods are described in U.S. Pat. Nos. 7,489,745, 7,436,910, 7,436,911, 7,436,912, 8,401,050 and 8,660,218, each of which is incorporated herein by reference in its entirety for all purposes.

Looking back to FIG. 5, sampling circuitry 504 may be implemented in any manner suitable to use the three or more sampling clock signals from sampling clocks 508 to produce three or more different projections of the same data from RF input 502. For example, clock signals from the different clocks 510, 512, 514 . . . 516 may be added together into a single sampler provided in sampling circuitry 504. The clock signals from the different clocks 510, 512, 514 . . . 516 may also be provided to separate samplers provided in sampling circuitry 504, and the output of the samplers can be added together.

FIG. 6A illustrates one exemplary embodiment of a multiple clock RF receiver sampling system 500 in which sampling circuitry 504 includes multiple samplers 602, 604, 606 . . . 608 that correspond to respective sampling clocks 510, 512, 514 . . . 516. Sampling clocks 510, 512, 514 . . . 516 simultaneously provide sampling clock signals to sampling circuitry 504. As shown in FIG. 6A, the multiple samplers 602, 604, 606 . . . 608 of sampling circuitry 504 each receives RF input 502 and samples data according to a clock signal from one of sampling clocks 510, 512, 514 . . . 516, respectively. As shown in FIG. 6A, multiple samplers 602, 604, 606 . . . 608 of sampling circuitry 504 each receives RF input 502 and samples data according to a respective clock signal from a corresponding one of sampling clocks 510, 512, 514 . . . 516, respectively. In this regard, the total number of separate samplers in system 500 of FIG. 6A may be three in one embodiment, and may be more than three in other embodiments. In this embodiment, the outputs from each of samplers 602, 604, 606 . . . 608 are then added together by adder circuitry 610 as shown to generate the sampled output 506 that includes at least three images. This sampled output 506 can then be processed further to identify signals within the RF input 502. In one embodiment, the three images may be provided as separate and simultaneous sampling paths within the combined sampled output 506.

It is noted that the outputs of the samplers 602, 604, 606 . . . 608 may be configured in one exemplary embodiment with different gains so that they generate different magnitude responses before the outputs are added together in adder circuitry 610. In such an embodiment, additional information may be obtained by comparing the different amplitudes of the resultant images in the combined sampled output 506 to determine which clock 510, 512, 514 . . . 516 generated which image in the sampled output 506. For example, the sampling clock 510, 512, 514 . . . 516 for the sampler 602, 604, 606 . . . 608 having the lowest gain may be identified as producing the resulting image with the lowest amplitude, and the sampling clock 510, 512, 514 . . . 516 for the sampler 602, 604, 606 . . . 608 having the highest gain may be identified as producing the resulting image with the highest amplitude. In one exemplary embodiment, a digital signal processor (DSP) may be configured to make this comparison in the quantized digital output from an analog to digital converter (ADC), such as in the system shown in FIG. 10A.

FIG. 6B illustrates another exemplary embodiment of a multiple clock RF receiver sampling system 500 in which sampling circuitry 504 also includes multiple samplers 602, 604, 606 . . . 608 that correspond to three or more respective sampling clocks 510, 512, 514 . . . 516. As shown in FIG. 6B, multiple samplers 602, 604, 606 . . . 608 of sampling circuitry 504 each receives RF input 502 and samples data according to a respective clock signal from a corresponding one of sampling clocks 510, 512, 514 . . . 516, respectively. As in the embodiment of FIG. 6A, sampling clocks 510, 512, 514 . . . 516 simultaneously provide sampling clock signals to sampling circuitry 504. As shown in FIG. 6B, multiple samplers 602, 604, 606 . . . 608 of sampling circuitry 504 each receives RF input 502 and samples data according to a respective clock signal from one of sampling clocks 510, 512, 514 . . . 516, respectively. In this regard, the total number of separate sampling clocks and total number of corresponding separate samplers in system 500 of FIG. 6B may be three in one embodiment, and the total number of separate sampling clocks and total number of corresponding separate samplers in system 500 of FIG. 6 may be more than three in other embodiments.

In the embodiment of FIG. 6B, the output from each of samplers 602, 604, 606 . . . 608 is provided as a separate and different channel to yield at least three separate and different parallel channels 692, 694, 696 . . . 698 of the sampled output 506. Each of the at least three channels of the sampled output 506 of FIG. 6B includes a different folding (or aliasing) image from the other channels, and therefore the sampled output 506 includes at least three different images which are different folding (or aliasing) images from each other. In the embodiment of FIG. 6B, the multiple separate and different parallel channels 692, 694, 696 . . . 698 are not combined with each other, but rather are provided as separate individual channels that are output individually from the sampling circuitry 504. In one exemplary embodiment, the respective sampling clock rate for each of sampling clocks 510, 512, 514 . . . 516 does not change over time. Instead, the sampling clock rate is different for each of sampling clocks 510, 512, 514 . . . 516, so that the sampling clock rate changes over (or across) the multiple channels 692, 694, 696 . . . 698 of sampled output 506, i.e., at any given time each of the different respective channels 692, 694, 696 . . . 698 has a different sampling clock rate than each of the other respective channels of sampled output 506 so that a given signal in RF input 502 will simultaneously see all the different sample rates of sampling clocks 510, 512, 514 . . . 516.

In one exemplary embodiment, a total of three different folding (or aliasing) images may be produced in a system embodiment of FIG. 6B that has a total of three samplers that produce a total of three respective separate parallel channels, whereas more than three different folding (or aliasing) images may be produced in embodiments that have more than three samplers that produce greater than three separate respective parallel channels, e.g., such as in an exemplary embodiment where four or more samplers produce four or more respective separate parallel channels. The multiple separate and different parallel channels 692, 694, 696 . . . 698 of the sampled output 506 can then be processed further as described herein to identify signals within the RF input 502.

FIG. 7 illustrates another exemplary embodiment of a multiple clock RF receiver sampling system 500 in which simultaneously-provided sampling clock signals from each of sampling clocks 510, 512, 514 . . . 516 are added together by adder circuitry 704 to produce a combined clock signal 705 that is then provided to a common sampler 702 of sampling circuitry 504. Sampler 702 samples the RF input 502 according to the combined clock signal 705, which includes the sampling clock signals from sampling clocks 510, 512, 514 . . . 516. Using this combined clock signal 705, the common sampler 702 generates the sampled output 506 that includes at least three images for further processing. In one embodiment, the sampled output 506 may include the three images in separate and simultaneous sampling paths of the sampled output 506 produced using the combined clock signal 705.

Figure 8:
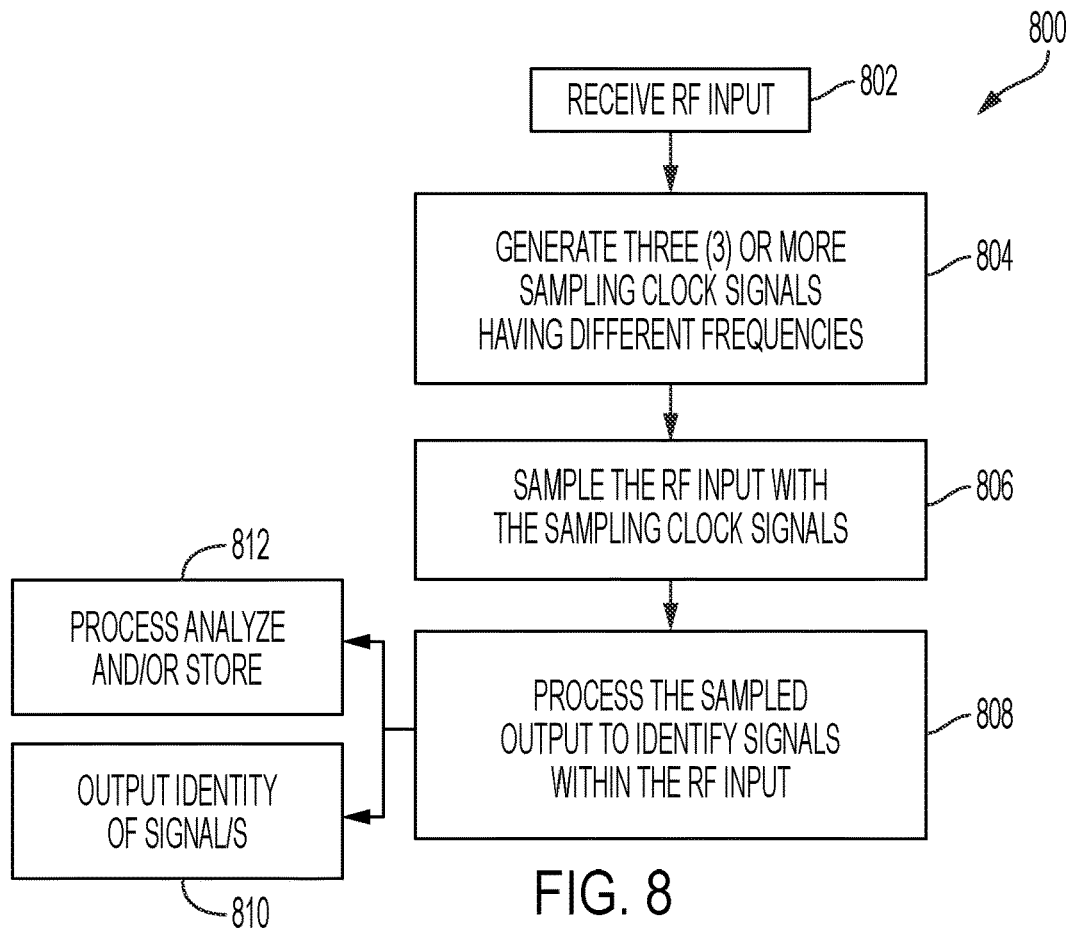
FIG. 8 is a flow diagram of an example embodiment for operation of a multiple clock RF receiver sampling system according to one exemplary embodiment of the disclosed systems and methods.

FIG. 8 is a flow diagram of an example embodiment 800 for operation of a multiple clock RF receiver sampling system architecture according to the disclosed systems and methods. In block 802, an RF input 502 is received. In block 804, sampling clock signals from three or more sampling clocks 510, 512, 514 . . . 516 are generated where each the sampling clock signals have a different frequency. In block 806, the RF input 502 is sampled using the different sampling clock signals. As shown in FIGS. 6-7, for example, different architectures can be used for the sampling circuitry 504 that samples the RF input 502 using the different sampling clock signals. In block 808, the sampled output 506 from the sampling circuitry 504 is processed to identify signals within the RF input. It is noted that additional and/or different steps can also be implemented while still taking advantage of the techniques described herein.

Figure 9A:
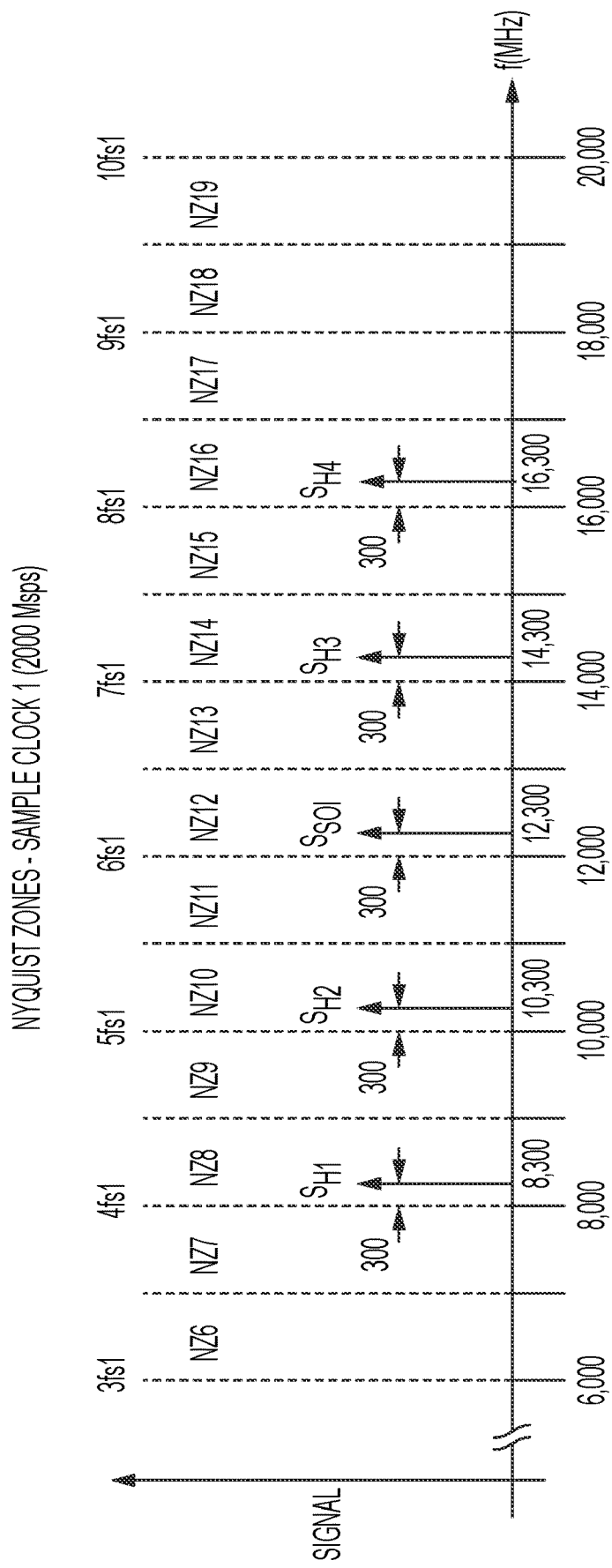
FIG. 9A is a Nyquist zone diagram according to one exemplary embodiment of the disclosed systems and methods.
Figure 9B:
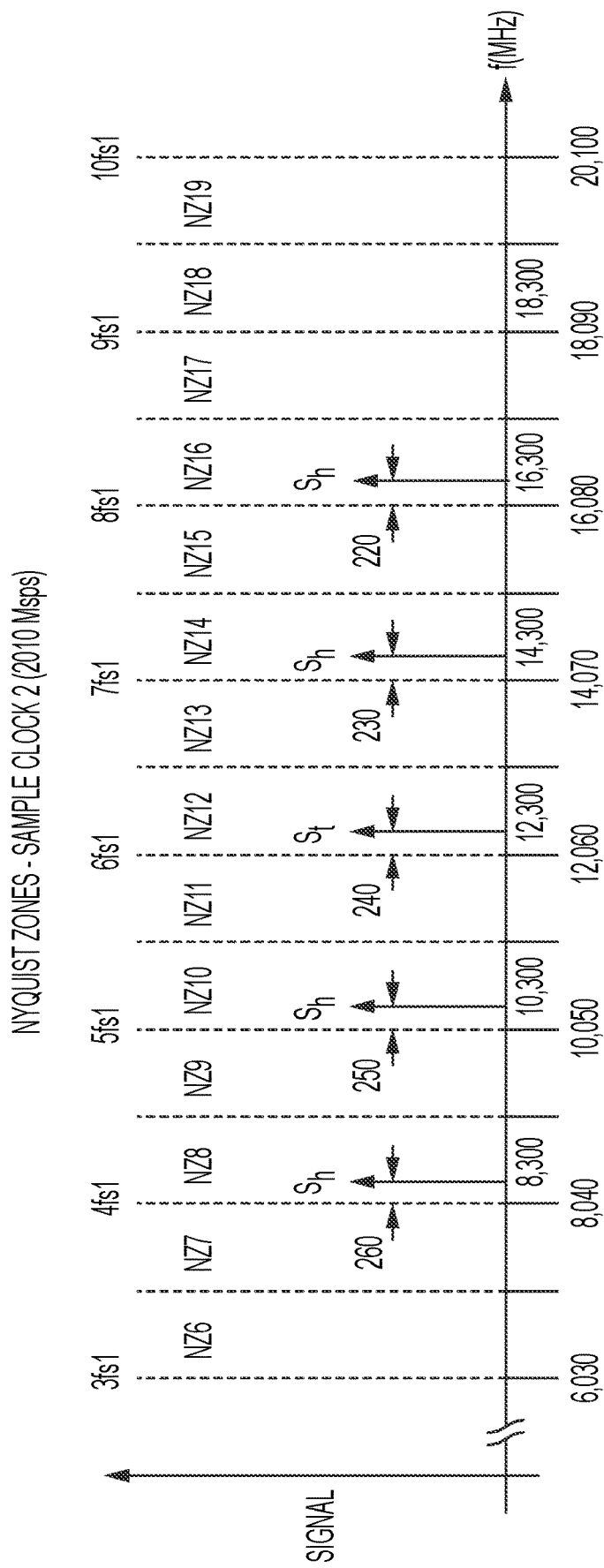
FIG. 9B is a Nyquist zone diagram according to one exemplary embodiment of the disclosed systems and methods.
Figure 9C:
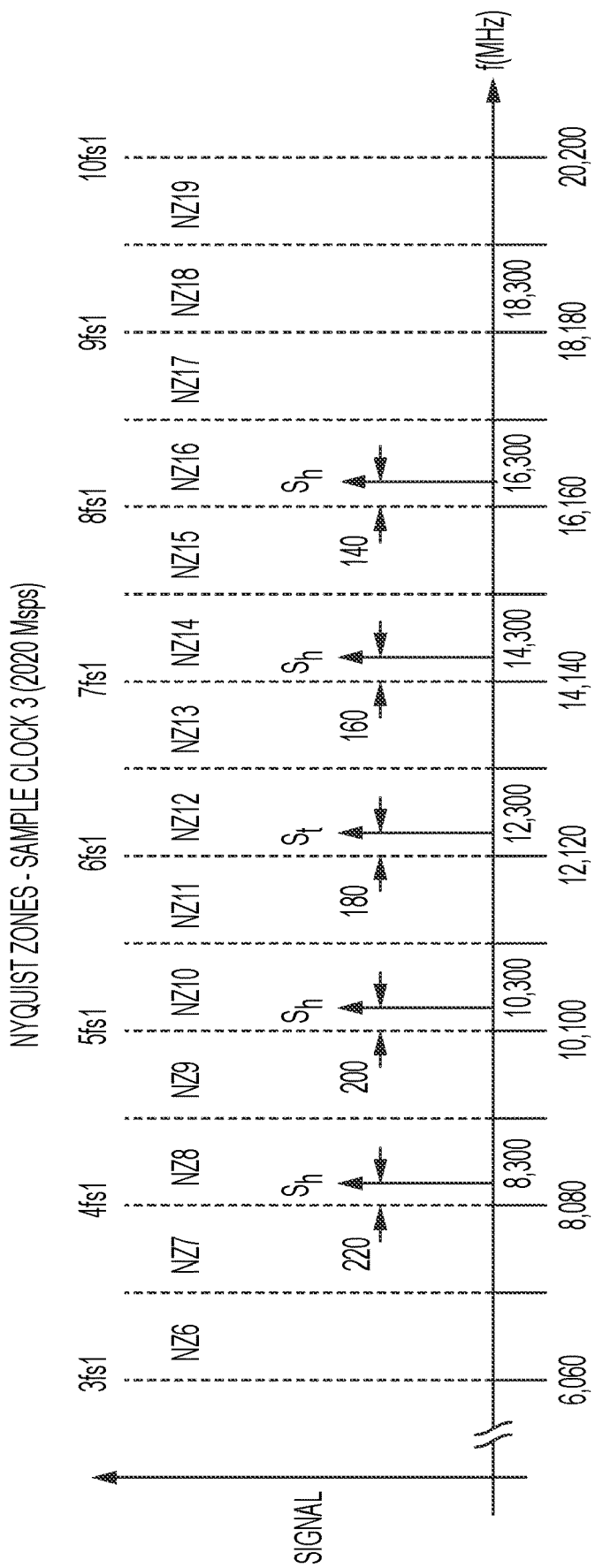
FIG. 9C is a Nyquist zone diagram according to one exemplary embodiment of the disclosed systems and methods.

FIGS. 9A-9C illustrate an example Nyquist zone diagrams in which multiple clock sampling may be implemented to correctly identify the proper Nyquist zone corresponding to a signal of interest. It is noted that the Nyquist zones in FIGS. 9A-9C are labeled based upon the assumption that the baseband Nyquist zone from $f_s$ to $f_{S/2}$ is counted as the zero$^{th}$ Nyquist zone. As such, the first Nyquist zone (NZ1) is from $f_{S/2}$ to $f_S$ (not shown), the second Nyquist zone (NZ2) is from $f_S$ to $3f_{S/2}$ (not shown), the third Nyquist zone (NZ3) is from $3f_{S/2}$ to $2f_S$ (not shown), and so on. In this regard, FIGS. 9A-9C illustrate the sixth (NZ6) through nineteenth (NZ19) Nyquist zones. Signals in each of the Nyquist zones will be folded on top of each other during sampling, assuming that any input filter of the system allows these Nyquist zones to pass through to the RF sampling circuitry.

In one exemplary embodiment, each of FIGS. 9A-9C may correspond to a different folding (or aliasing) image that is present at intermediate frequency (IF) in one of the separate and different parallel channels 692, 694, 696 . . . 698 of the sampled output 506 of system 500 of FIG. 6B that is previously described, e.g., as provided at the output of ADC 1012 of FIGS. 10A and 10C described below, and at the output of ADC 1512 of sampling system 500 of FIG. 10D described below. However, it is also possible that the different folding (or aliasing) images of FIGS. 9A-9C may be present in multiple respective channels that are added together into a sampled output 506, e.g., such as in the embodiment of system 500 of FIG. 6A that is previously described. Each of FIGS. 9A-9C illustrates a different folding (or aliasing) image that is produced by a respective different non-modulated sampling clock signal received from a respective different sampling clock 510, 512, 514 . . . 516. However, in other embodiments, a group of different folding (or aliasing) images may be similarly produced by a combination of different non-modulated and modulated sampling clock signals.

FIG. 9A illustrates a Nyquist zone diagram for sampling an RF input with a first sampling clock 510. In FIG. 9A, the RF input includes an RF signal of interest having a frequency of 12,300 MHz with a chip duration of 1 µs is sampled using a multi-clock sampling technique according to the disclosed systems and methods. In this example, the first sampling clock 510 produces a sampling clock signal centered at 2000 mega-samples per second (Msps). As may be seen in FIG. 9A, the signal of interest ($S_{SOI}$) is located in Nyquist zone 12 (i.e., "NZ12" which extends from 12,000 ($6f_{S1}$) to 13,000 ($13f_{S1}/2$)) and is 300 MHz away from $6f_{s1}$. As may be seen, other hypothetical candidate signals (e.g., $S_{H1}$, $S_{H2}$, $S_{H3}$ and $S_{H4}$) could exist 300 MHz from a nearby harmonic of the sampling clock signal (e.g., in nearby Nyquist zones 8, 10, 14, and 16 that are within two even Nyquist zones on either side of the true Nyquist zone 12 and correspond to RF hypotheses of approximately 8.3, 10.3, 12.3, 14.3, and 16.3 GHz respectively). The sampled signal of interest ($S_{SOI}$) is not detectable with only the sampled data corresponding to the first sampling clock 510 due to the multiple folded images at 300 MHz in FIG. 9A.

As described herein, two or more additional sampling clocks 512, 514 . . . 516 are used to accurately identify signals of interest within the RF input. FIGS. 9B and 9C provide example Nyquist zone diagrams for two example additional sampling clocks.

FIG. 9B illustrates a Nyquist zone diagram for sampled data from the second sampling clock 512 which is used to sample the same input data as sampled using the first sample clock 510, but at a center frequency of 2010 mega-samples-per-second (Msps). The possible signal solutions of FIG. 9A obtained from the sampled data based on the first clock 510 (i.e., $S_{H1}$, $S_{H2}$, $S_{SOI}$, $S_{H3}$ and $S_{H4}$) would now correspond to folded frequencies of 260, 250, 240, 230, and 220 MHz, respectively, as shown in FIG. 9B. The actual folded image for the signal of interest based upon the second sample clock 512 exists at 240 MHz, which helps to eliminate all hypotheses but 12.3 GHz, which is the correct signal of interest. Therefore, the sampled data based on second sampling clock 512 may be employed to help identify the correct Nyquist zone of the signal of interest from the multiple possible Nyquist zones obtained from sampled data obtained using the first sampling clock 510.

It has been found, however, that three or more sampling clocks provide advantageous solutions to remove potential ambiguity in detected signals of interest. For example, a signal of interest could be located at the same distance from each of the sampling signals generated by the sampling clocks 510 and 512, and this condition can lead to ambiguities in signal detection.

FIG. 9C illustrates a Nyquist zone diagram for sampled data from the third sampling clock 514 which is used to sample the same input data as sampled using the first sample clock 510 and the second sample clock 512, but at a center frequency of 2020 Msps. The possible signal solutions of FIG. 9A obtained from the sampled data based on the first clock 510 (i.e., $S_{H1}$, $S_{H2}$, $S_{SOI}$, $S_{H3}$ and $S_{H4}$) would now correspond to folded frequencies of 220, 200, 180, 160, and 140 MHz, respectively, as shown in FIG. 9C. The actual folded image for the signal of interest based upon the third sample clock 514 exists at 180 MHz, which eliminates all hypotheses but 12.3 GHz, which is the correct signal of interest. Therefore, the sampled data based on third sampling clock 514 may be employed to help identify the correct Nyquist zone of the signal of interest from the multiple possible Nyquist zones obtained from sampled data obtained using the first sampling clock 510 and the second sampling clock 512.

FIGS. 10A-10D illustrate exemplary embodiments of sampling receiver architectures with which the disclosed multiple clock RF receiver sampling systems may be implemented. Further example information on the possible structure and operation of one or more individual components that may or may not be present in a given multiple clock RF receiver sampling system embodiment described herein may be found described in U.S. Pat. Nos. 7,436,912 and 8,401,050, each of which is incorporated herein by reference in its entirety for all purposes.

Figure 10A:
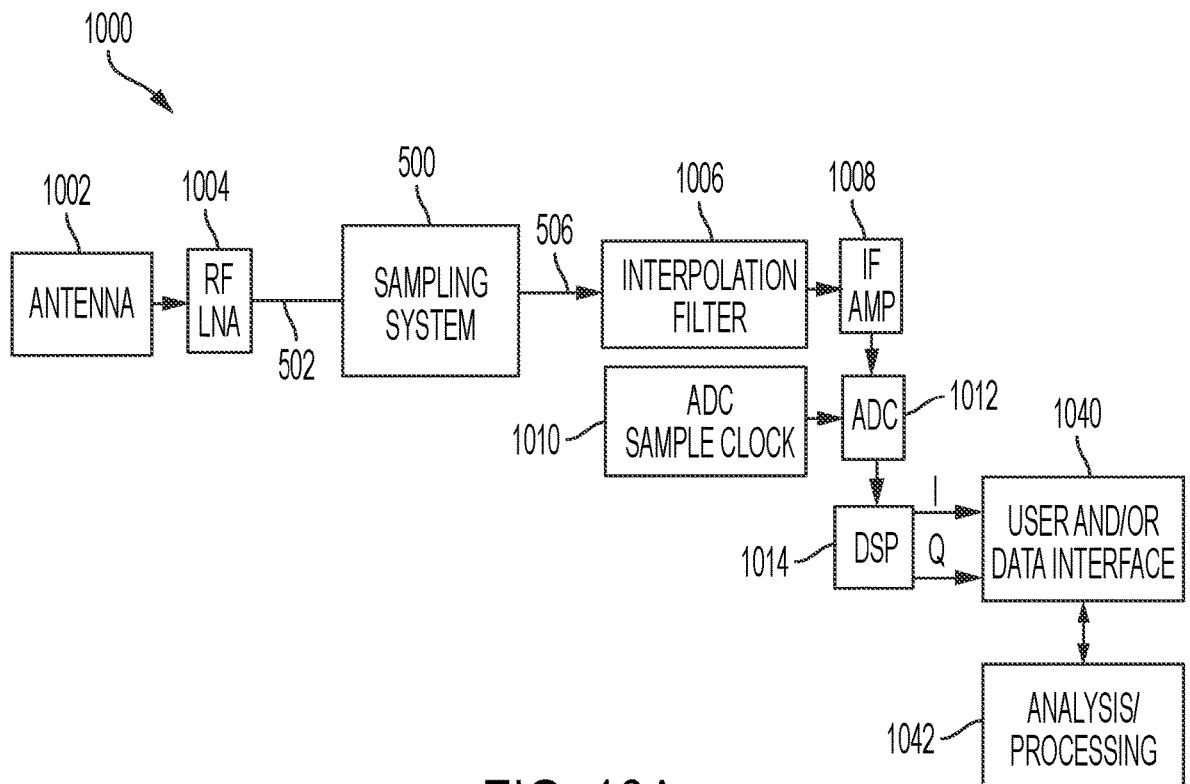
FIG. 10A is a block diagram according to exemplary embodiment of the disclosed systems and methods.

FIG. 10A provides an example receiver embodiment 1000 that includes antenna 1002 and an RF low noise amplifier (LNA) 1004 that provides an RF input 502 to the sampling system 500. The sampled output 506 is provided to analog interpolation filter 1006, an intermediate frequency (IF) amplifier 1008, and an ADC 1012. The ADC 1012 receives an ADC sample clock 1010 and provides digital data to a digital signal processor (DSP) 1014.

Figure 10B:
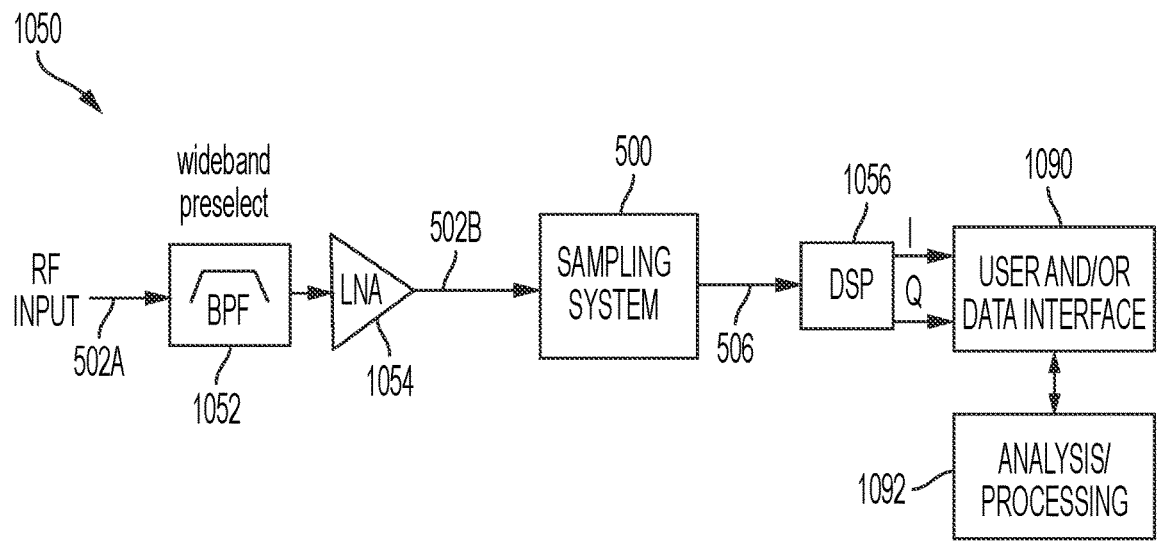
FIG. 10B is a block diagram according to exemplary embodiment of the disclosed systems and methods.

FIG. 10B provides an example receiver embodiment 1050 that includes a wideband bandpass filter (BPF) 1052 and an LNA 1054 that receive an RF input 502A and then output an RF input 502B to the sampling system 500. The BPF 1052 outputs a filtered signal including the input signals, and the BPF 1052 preferably includes wideband filter circuitry having a center frequency within a frequency range of interest and having a bandwidth less than or equal to the frequency range of interest and wide enough to cover multiple Nyquist zones associated with the sampling clock signals generated by the sampling circuitry 504. The sampled output 506 is provided to a DSP 1056.

Figure 10C:
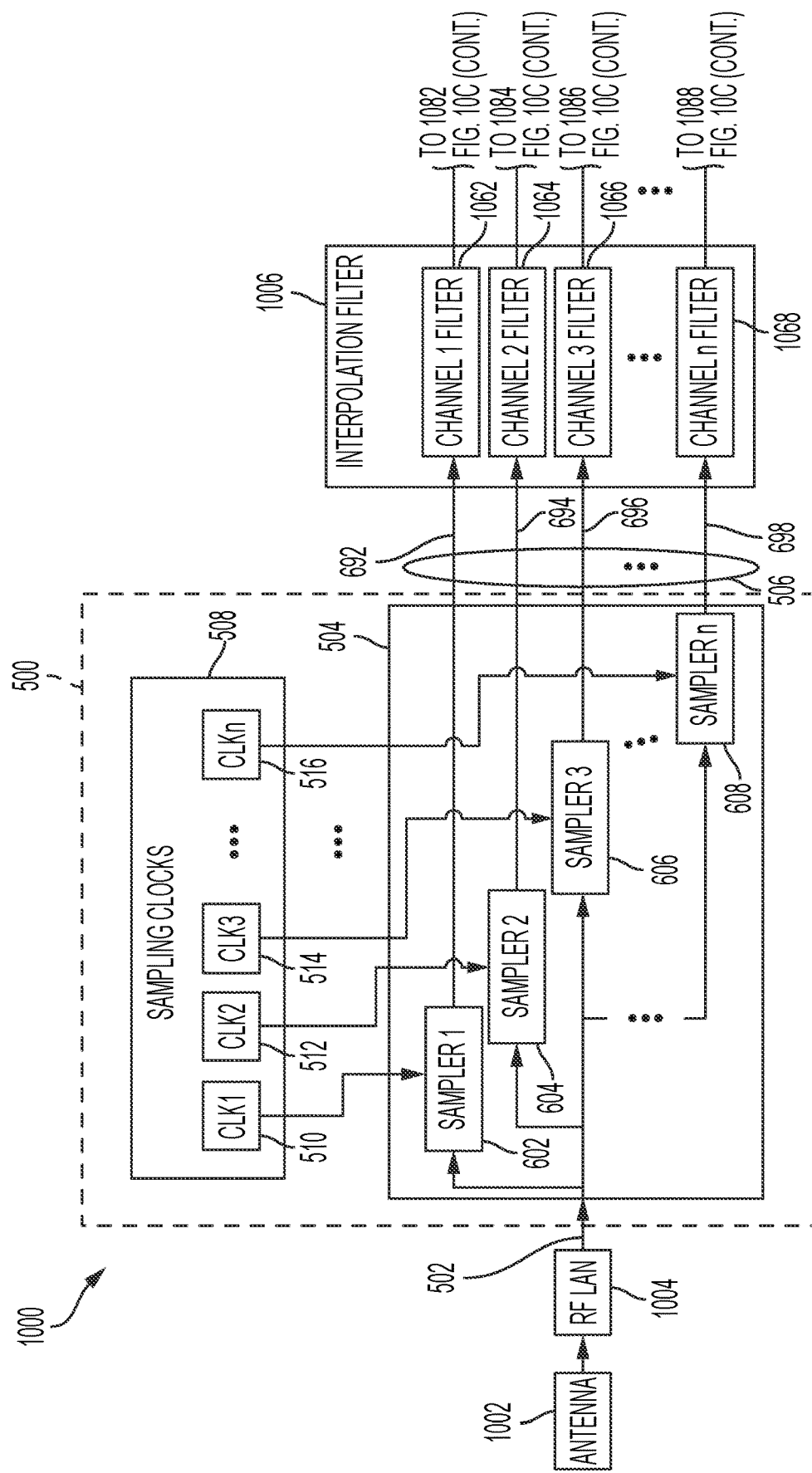
FIG. 10C is a block diagram according to exemplary embodiment of the disclosed systems and methods.
Figure 10C:
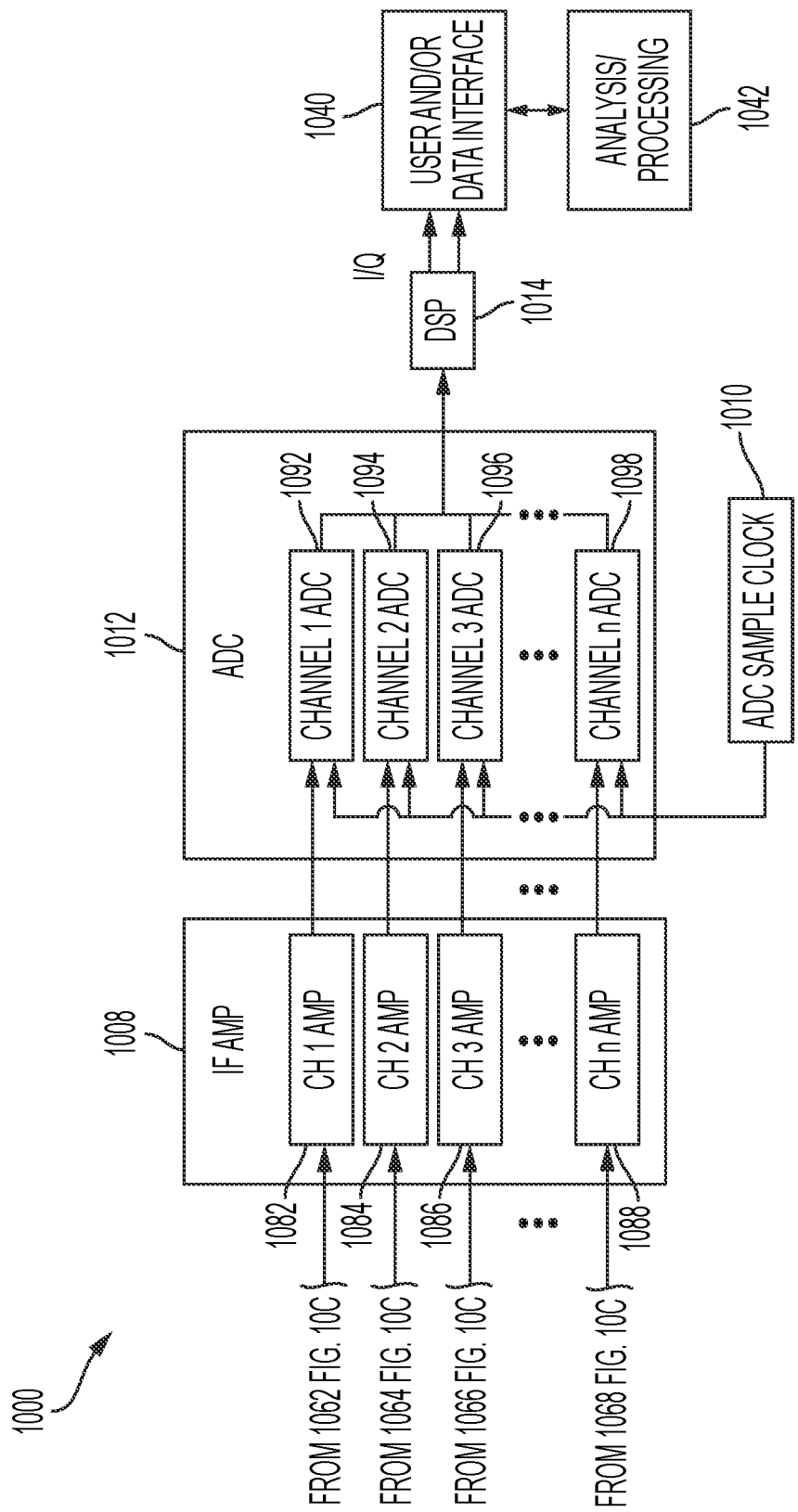

FIG. 10C provides an example receiver embodiment 1000 of FIG. 10A that is configured to simultaneously process the at least three separate and different parallel channels 692, 694, 696 . . . 698 of the sampled output 506 of the embodiment of sampling system 500 of FIG. 6B for input to DSP 1014. As shown in FIG. 10C, the individual channels 692, 694, 696 . . . 698 of the sampled output 506 are separately provided to corresponding respective separate channel analog interpolation filters 1062, 1064, 1066 . . . 1068 of analog interpolation filter 1006, corresponding separate channel IF amplifiers 1082, 1084, 1086 . . . 1088 of IF amplifier 1008, and corresponding separate channel ADCs 1092, 1094, 1096 . . . 1098 of ADC 1012. As shown, each of the separate channel ADCs 1092, 1094, 1096 . . . 1098 of ADC 1012 receives the same clock signal from ADC sample clock 1010, and ADC 1012 combines the resulting digital signals from separate channel ADCs 1092, 1094, 1096 . . . 1098 into a single combined digital signal output that is provided from ADC 1012 of FIG. 10C to digital signal processor (DSP) 1014.

Figure 10D:
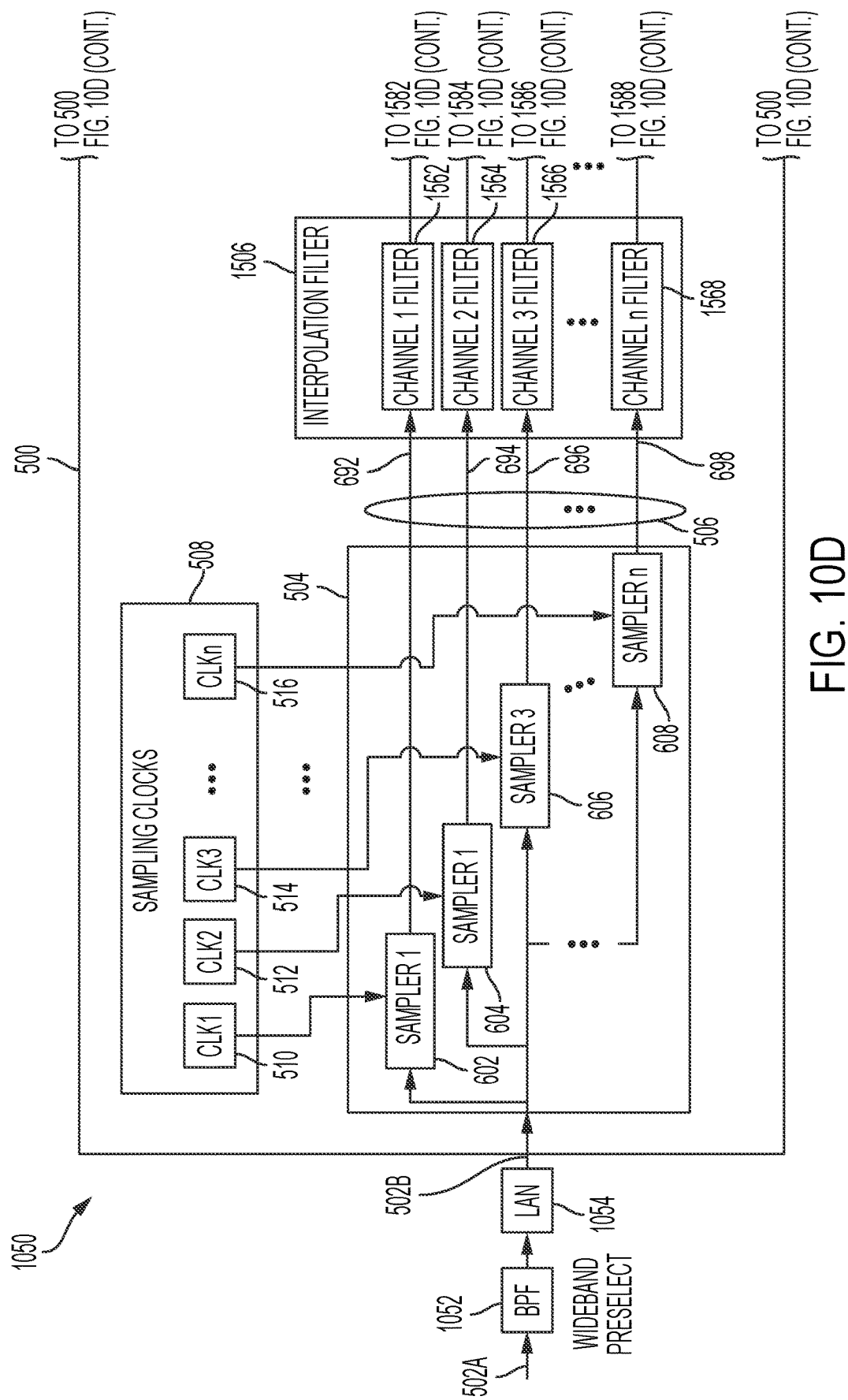
FIG. 10D is a block diagram according to exemplary embodiment of the disclosed systems and methods.
Figure 10D:
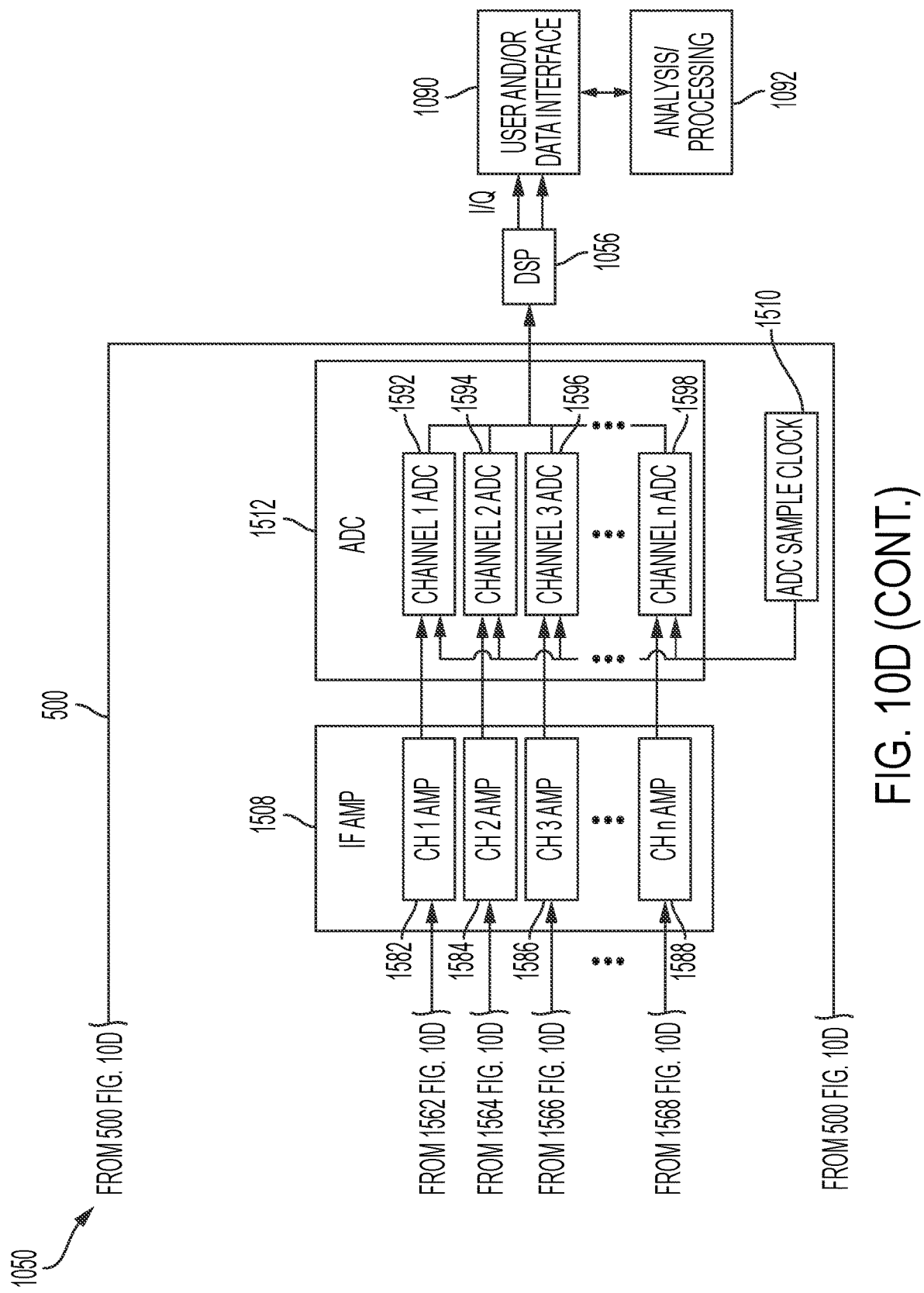

FIG. 10D provides an example receiver embodiment 1050 of FIG. 10B that is configured to simultaneously process the at least three separate and different parallel channels 692, 694, 696 . . . 698 of the sampled output 506 within an integrated sampling system 500 of FIG. 6B. As shown, sampling system 500 of this embodiment is configured to create and process the individual channels 692, 694, 696 . . . 698 of the sampled output 506 separately within corresponding respective separate channel analog interpolation filters 1562, 1564, 1566 . . . 1568 of integrated analog interpolation filter 1006; corresponding separate channel IF amplifiers 1582, 1584, 1586 . . . 1588 of integrated IF amplifier 1508, and corresponding separate channel ADCs 1592, 1594, 1596 . . . 1098 of integrated ADC 1512. As shown, each of the separate channel ADCs 1592, 1594, 1096 . . . 1598 of integrated ADC 1512 receives the same clock signal from integrated ADC sample clock 1510, and integrated ADC 1512 of sampling system 500 combines the resulting digital signals from separate channel ADCs 1592, 1594, 1596 . . . 1598 into a single combined digital signal output that is provided from sampling system 500 of FIG. 10D to digital signal processor (DSP) 1056 as shown.

It is noted that the DSPs 1014 and 1056 in FIGS. 10A-10D can be configured to receive digital signals from sampling circuitry 500 or ADC 1012 (depending on the embodiment) and process these digital signals to identify RF signals within the RF inputs. For example, DSPs 1014/1056 may be configured to process multiple images generated by a multiple clock RF receiver sampling system described herein to identify different signals from different Nyquist zones based in part upon the frequency position of folded images generated by sampling caused by three or more different sampling clocks. The DSP circuitry 1014/1056 may then identify a signal of interest from the given Nyquist zone as the candidate signal having a hypothetical folded frequency that substantially matches an actual folded frequency that results from sampling of the given input signal caused by the different sampling clocks.

In one exemplary embodiment, DSPs 1014/1056 may be configured to process multiple images generated by a multiple clock RF receiver sampling system described herein to identify different signals from different Nyquist zones. For example, DSPs 1014/1056 may be programmed to make this signal identification based upon the respective different folding patterns of three or more respective different channels 692, 694, 696 . . . 698 (or of three or more separate and simultaneous sampling paths of sampled output 506 of FIGS. 6A or 7) that are produced simultaneously using three or more respective different RF sampling rates (e.g., non-modulated sampling rates that do not change with time). Since a given RF signal of interest (SOI) will generate a respective and different folded image within the folding pattern of the sampled data of each different channel 692, 694, 696 . . . 698 (or of each different simultaneous sampling path of sampled output 506 of FIGS. 6A or 7), DSPs 1014/1056 may be programmed to solve for and identify the particular RF SOI that matches the folded image within each of the folding patterns of the respective different channels 692, 694, 696 . . . 698 (or of the respective simultaneous sampling paths of sampled output 506 of FIGS. 6A or 7). It will be understood that the folding pattern of each channel that is produced by a respective non-modulated RF sampling rate is constant and does not change over time.

In some respective embodiments illustrated herein, DSPs 1014 and 1056 may each be implemented by at least one programmable integrated circuit that is coupled (e.g., via a data bus and output circuitry such as graphics processing unit (GPU), digital to analog converter (DAC) with audio amplifier, etc.) to one or more output devices, e.g., that may include a respective interface 1040 or 1090 (e.g., user interface and/or data interface) as illustrated in the respective figures herein. In on embodiment, the programmable integrated circuit/s of each of DSPs 1014 and 1056 may communicate data or information about a given RF signal across a corresponding interface 1040 or 1090 that identifies a frequency (e.g., identified RF frequency) of the identified given RF input signal or signal of interest to a user and/or to other respective circuitry 1042 or 1092 for further processing and analysis (e.g., such as further digital processing by additional programmable integrated circuit/s of circuitry 1042 or 1092 which may be implemented, for example, by a computer workstation, laptop or notebook computer, etc.).

For example, data or information about a given identified RF signal may be communicated across an interface 1040 or 1090 and further processed by programmable integrated circuit/s of circuitry 1042 or 1092, e.g., for purposes of recording and/or measuring the time duration of the given identified RF signal, allowing separate receiver circuitry to tune to the given identified RF signal, measuring the received signal strength (RSSI) of the given identified RF signal, determining the geolocation or direction of the emitter of a given identified RF signal using techniques such as time difference of arrival (TDOA) and/or frequency difference of arrival (FDOA), direction of arrival (DOA) and/or angle of arrival (AoA) of the given identified RF signal, etc. Examples of such geolocation processing techniques may be found described, for example, in U.S. Pat. Nos. 7,508,344 and 7,626,546, each of which is incorporated herein by reference in its entirety for all purposes.

Examples of processing and/or analysis techniques that may be implemented in combination with or using the disclosed RF sampling receiver systems include, for example, those receiving, processing and/or signal analysis techniques described in U.S. Pat. Nos. 7,489,745, 7,436,910, 7,436,911, 7,436,912, 8,401,050, and 8,660,218, each of which is incorporated herein by reference in its entirety for all purposes. For example, embodiments of the disclosed systems and methods may be employed, among other things, for monitoring signal environments and/or in communications systems (e.g., in communications receivers, in multi-mode communications systems, etc.) as well as in other devices, such as radar systems.

Examples of user interfaces include, but are not limited to at least one of a display device (e.g., LED or LCD display), audio output device (e.g., speaker or headphones)), etc., e.g., on which information (e.g., such as frequency) identifying a given RF signal may be displayed on a display device in a graphical user interface (GUI) and/or audibly communicated by a speaker or headphones to human user. Examples of data interfaces include, but are not limited to, at least one of a data storage device or data storage media (e.g., hard drive, solid state drive (SSD), USB Flash drive, etc.), network interface device (e.g., network interface controller (NIC)), etc., e.g., on which information (e.g., such as frequency) identifying a given RF signal may be stored (e.g., on a data storage device or data storage media) and/or communicated (e.g., across a computer network such as corporate intranet or Internet) to other computing systems and/or programmable integrated circuits for processing. It will be understood that a user interface and a data interface may be separate components from each other that are coupled to either one of a DSP 1014 or 1056, or may be combined into a single integrated unit that is coupled to either one of a DSP 1014 or 1056. In some embodiments, both a user interface and a data interface may be separately coupled to either one of DSPs 1014 or 1056. In some embodiments, multiple separate user and/or data interfaces may be coupled to receive data from either of DSPs 1014 and 1056.

It will be understood that FIGS. 10A-10D illustrate possible exemplary embodiments of particular multiple clock RF receiver sampling systems, and that the disclosed multiple clock RF receiver sampling system architecture may be implemented with any other RF receiver sampling system architecture for producing multiple simultaneously-sampled images.

It is noted that the functional blocks, devices, and/or circuitry described herein can be implemented using hardware, software, or a combination of hardware and software. In addition, one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) executing software, firmware, and/or other program instructions can be used to implement the disclosed embodiments. It is further understood that one or more of the operations, tasks, functions, or methodologies described herein can be implemented, for example, as software, firmware and/or other program instructions that are embodied in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) and that are used to program the one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) to perform the operations, tasks, functions, or methodologies described herein.

It will also be understood that one or more of the tasks, functions, or methodologies described herein (e.g., including those described herein for components 1014, 1056, 1040, 1042, 1090, 1092, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more steps of the present methodologies may be employed in one or more code segments of the computer program. For example, a code segment executed by a programmable integrated circuit/s may include one or more steps of the disclosed methodologies. It will be understood that a programmable integrated circuit may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. Receive path circuitry for a sampling receiver, comprising:
    three or more sampling clocks, each sampling clock being configured to produce a non-modulated sampling clock signal having a frequency different from frequencies for sampling clock signals produced by the other sampling clocks;
    sampling circuitry having a sampling circuitry input configured to receive input signals within a bandwidth wide enough to cover multiple Nyquist zones associated with the sampling clock signals, the sampling circuitry configured to receive the input signals and to receive each of the sampling clock signals from the sampling clocks, each of the sampling clock signals being configured to provide sampling for the input signals within the multiple Nyquist zones to produce a different image from the other sampling clocks; and a sampling circuitry output configured to produce an output signal that includes the different images generated by the three or more sampling clock signals.

2. The receive path circuitry of claim 1, where the output signal comprises three or more separate and different parallel channels, each of the parallel channels including one of the different images produced by sampling the input signals using a respective one of the three or more sampling clock signals having a frequency that is different than the frequency of the other three or more sampling clock signals that samples the input signals to produce the different images included in each of the other parallel channels.

3. The receive path circuitry of claim 1, where the sampling circuitry comprises:
   a first sampler coupled to receive the input signals from the sampling circuitry input and coupled to receive a first sampling clock signal from a first one of the sampling clocks, the first sampler configured to output a first image produced by sampling each of the input signals with the first sampling clock;
   a second sampler coupled to receive the input signals from the sampling circuitry input and coupled to receive a second sampling clock signal from a second one of the sampling clocks, the second sampler configured to output a second image produced by sampling each of the input signals with the second sampling clock;
   a third sampler coupled to receive the input signals from the sampling circuitry input and coupled to receive a third sampling clock signal from a third one of the sampling clocks, the third sampler configured to output a third image produced by sampling each of the input signals with the third sampling clock; and
   adder circuitry configured to combine outputs from the first, second, and third sampler to produce the sampling circuitry output signal.

4. The receive path circuitry of claim 1, where the sampling circuitry comprises:
   a first sampler coupled to receive the input signals from the sampling circuitry input and coupled to receive a first sampling clock signal from a first one of the sampling clocks, the first sampler configured to output a first image produced by sampling each of the input signals with the first sampling clock;
   a second sampler coupled to receive the input signals from the sampling circuitry input and coupled to receive a second sampling clock signal from a second one of the sampling clocks, the second sampler configured to output a second image produced by sampling each of the input signals with the second sampling clock; and
   a third sampler coupled to receive the input signals from the sampling circuitry input and coupled to receive a third sampling clock signal from a third one of the sampling clocks, the third sampler configured to output a third image produced by sampling each of the input signals with the third sampling clock;
   where each of the first sampling clock signal, second sampling clock signal and third sampling clock signal has a sampling rate that is different than the sampling rate of each of the other sampling clock signals; and
   where the output signal comprises three or more separate and different parallel channels, each of the parallel channels including only one of the first image, second image or third image.

5. The receive path circuitry of claim 1, further comprising:
   a first sampling clock configured to produce a first sampling clock signal;
   a second sampling clock configured to produce a second sampling clock signal; and
   a third sampling clock configured to produce a third sampling clock signal;
   where the sampling circuitry comprises:
      adder circuitry coupled to receive the first, second, and third sampling clock signals and configured to combine the first, second, and third sampling clock signals to produce a combined sampling clock signal, and
      a common sampler coupled to receive the combined sampling clock signal, the common sampler configured to output first, second, and third images with the combined sampling clock signal, the first image corresponding to the first sampling clock signal, the second image corresponding to the second clock signal, and the third image corresponding to the third clock signal.

6. The receive path circuitry of claim 1, where the sampling circuitry comprises non-quantizing sampling circuitry, and wherein the receive path circuitry further comprises:
   an analog interpolation filter coupled to receive the output of the non-quantizing sampling circuitry, the analog interpolation filter having a center frequency within a Nyquist zone of operation for the non-quantizing sampling circuitry; and
   analog to digital converter (ADC) circuitry configured to receive a quantization sampling clock signal and to quantize an analog signal received from the analog interpolation filter.

7. The receive path circuitry of claim 1, further comprising:
   digital signal processing circuitry coupled to receive the output from the sampling circuitry and configured to identify different signals from different Nyquist zones based at least in part upon frequency position of folded images generated by the sampling clock signals;
   where the digital signal processing circuitry is configured to identify a given input signal from a given Nyquist zone by:
      determining frequency positions of multiple possible candidate signals from different Nyquist zones based upon the sampling clock signals,
      determining hypothetical folded frequencies corresponding to each of the frequency positions of the multiple possible candidate signals that would result by sampling caused by the sampling clock signals, and
      identifying the given input signal from the given Nyquist zone as the candidate signal having a hypothetical folded frequency that matches an actual folded frequency that results from sampling of the given input signal caused by the sampling clock signals.

8. The receive path circuitry of claim 1, further comprising:
   digital signal processing circuitry coupled to receive the output from the sampling circuitry and configured to identify different signals from different Nyquist zones based at least in part upon frequency position of folded images generated by the sampling clock signals;

where the digital signal processing circuitry is configured to identify a given input signal from a given Nyquist zone by:
    determining frequency positions of multiple possible candidate signals from different Nyquist zones based upon the first sampling clock signal; and
    identifying the given input signal from the given Nyquist zone as the candidate signal having a folded frequency that matches the folded frequency that results from sampling of the given input signal caused by the other sampling clock signals.

9. A method for bandpass sampling of signals using folded Nyquist zones, comprising:
    providing sampling circuitry;
    generating three or more non-modulated sampling clock signals for sampling within the multiple Nyquist zones, each of the sampling clock signals having a frequency that is different from frequencies for other of the sampling clock signals;
    utilizing sampling circuitry to sample input signals within the multiple Nyquist zones with each of the sampling clock signals to produce multiple different images corresponding to each of the input signals; and
    producing an output signal from the sampling circuitry that includes the multiple different images generated by sampling each of the input signals using each of the multiple sampling clock signals.

10. The method of claim 9, where the output signal comprises three or more separate and different parallel channels, each of the parallel channels including one of the different images produced by sampling the input signals using a respective one of the three or more sampling clock signals having a frequency that is different than the frequency of the other three or more sampling clock signals that samples the input signals to produce the different images included in each of the other parallel channels.

11. The method of claim 9, further comprising:
    generating a first sampling clock signal and sampling the input signals using the first sampling clock signal to produce a first image corresponding to each input signal;
    generating a second sampling clock signal and sampling the input signals using the second sampling clock signal to produce a second image corresponding to each input signal;
    generating a third sampling clock signal and sampling the input signals using the third sampling clock signal to produce a third image corresponding to each input signal; and
    combining the first, second, and third images to produce the output signal from the sampling circuitry.

12. The method of claim 9, further comprising:
    generating a first sampling clock signal and sampling the input signals using the first sampling clock signal to produce a first image corresponding to each input signal;
    generating a second sampling clock signal and sampling the input signals using the second sampling clock signal to produce a second image corresponding to each input signal;
    generating a third sampling clock signal and sampling the input signals using the third sampling clock signal to produce a third image corresponding to each input signal;
    where each of the first sampling clock signal, second sampling clock signal and third sampling clock signal has a sampling rate that is different than the sampling rate of each of the other sampling clock signals; and
    where the output signal comprises three or more separate and different parallel channels, each of the parallel channels including only one of the first image, second image or third image.

13. The method of claim 9, further comprising:
    generating a first sampling clock signal;
    generating a second sampling clock signal;
    generating a third sampling clock signal;
    combining the first, second, and third sampling clock signals to produce a combined sampling clock signal; and
    sampling the input signals with the combined sampling clock signal to produce a first image corresponding to each given input signal sampled by the first sampling clock signal, a second image corresponding to each input signal produce sampled by the second clock signal, and a third image corresponding to each input signal produce sampled by the third clock signal.

14. The method of claim 9, further comprising:
    identifying different signals from different Nyquist zones based at least in part upon frequency position of folded images generated by sampling caused by the sampling clock signals; and
    identifying a given input signal from a given Nyquist zone by:
        determining frequency positions of multiple possible candidate signals from different Nyquist zones based upon the sampling clock signals,
        determining the hypothetical folded frequencies corresponding to each of the frequency positions of the multiple possible candidate signals that would result by sampling caused by the sampling clock signals, and
        identifying the given input signal from the given Nyquist zone as the candidate signal having a hypothetical folded frequency that matches an actual folded frequency that results from sampling of the given input signal caused by the sampling clock signals.

15. The method of claim 9, further comprising:
    identifying different signals from different Nyquist zones based at least in part upon frequency position of folded images generated by sampling caused by the sampling clock signals; and
    identifying a given input signal from a given Nyquist zone by:
        determining frequency positions of multiple possible candidate signals from different Nyquist zones based upon the first sampling clock, and
        identifying the given input signal from the given Nyquist zone as the candidate signal having a folded frequency that matches the folded frequency that results from sampling of the given input signal caused by the other sampling clock signals.

16. Receive path circuitry for a sampling receiver, comprising:
    three or more sampling clocks, each sampling clock producing a sampling clock signal having a frequency different from frequencies for sampling clock signals produced by the other sampling clocks;
    sampling circuitry having a sampling circuitry input receiving input signals within a bandwidth wide enough to cover multiple Nyquist zones associated with the sampling clock signals, the sampling circuitry receiving the input signals and to receive each of the sampling clock signals from the sampling clocks, each of the sampling clock signals providing sampling for the input signals within the multiple Nyquist zones to produce a different image from the other sampling clocks; and a sampling circuitry output producing an output signal that includes the different images generated by the three or more sampling clock signals;

where the output signal comprises three or more separate and different parallel channels, each of the parallel channels including one of the different images produced by sampling the input signals using a respective one of the three or more sampling clock signals having a frequency that is different than the frequency of the other three or more sampling clock signals that samples the input signals to produce the different images included in each of the other parallel channels.

17. The receive path circuitry of claim 16, further comprising digital signal processing circuitry coupled to receive the three or more separate and different parallel channels of the output signal from the sampling circuitry and programmed to identify different signals from different Nyquist zones based upon frequency position of folded images generated by the sampling clock signals.

18. The receive path circuitry of claim 17, where each of the three or more sampling clock signals is non-modulated.

19. The receive path circuitry of claim 17, where the digital signal processing circuitry is programmed to identify a given input signal from a given Nyquist zone by:
    determining frequency positions of multiple possible candidate signals from different Nyquist zones based upon the sampling clock signals; and
    identifying the given input signal from the given Nyquist zone as the candidate signal having a folded frequency that matches a folded frequency within each of the different images of the three or more separate and different parallel channels that is generated by the three or more sampling clock signals.

20. The receive path circuitry of claim 19, where the digital signal processing circuitry is coupled to at least one of a user interface or data interface; and where the digital signal processing circuitry is programmed to communicate an identified frequency of the given input signal via the user interface to a user and/or via the data interface to data storage or a programmable integrated circuit/s for further processing.

21. A method for bandpass sampling of signals using folded Nyquist zones, comprising:
    providing sampling circuitry;
    producing three or more sampling clock signals for sampling within the multiple Nyquist zones, each of the sampling clock signals having a frequency that is different from frequencies for other of the sampling clock signals;
    utilizing sampling circuitry to sample input signals within the multiple Nyquist zones with each of the sampling clock signals to produce multiple different images corresponding to each of the input signals; and
    producing an output signal from the sampling circuitry that includes the multiple different images generated by sampling each of the input signals using each of the multiple sampling clock signals;
    where the output signal comprises three or more separate and different parallel channels, each of the parallel channels including one of the different images produced by sampling the input signals using a respective one of the three or more sampling clock signals having a frequency that is different than the frequency of the other three or more sampling clock signals that samples the input signals to produce the different images included in each of the other parallel channels.

22. The method of claim 21, further comprising identifying different signals from different Nyquist zones based at least in part upon frequency position of folded images generated by the sampling clock signals.

23. The method of claim 22, where each of the three or more sampling clock signals is non-modulated.

24. The method of claim 22, further comprising identifying a given input signal from a given Nyquist zone by:
    determining frequency positions of multiple possible candidate signals from different Nyquist zones based upon the sampling clock signals; and
    identifying the given input signal from the given Nyquist zone as the candidate signal having a folded frequency that matches a folded frequency within each of the different images of the three or more separate and different parallel channels that is generated by the three or more sampling clock signals.

25. The method of claim 24, further comprising communicating an identified frequency of the given input signal to a user and/or to data storage or other programmable integrated circuit/s for further processing.

* * * * *